US011022500B2

(12) United States Patent
Yuan et al.

(10) Patent No.: US 11,022,500 B2
(45) Date of Patent: Jun. 1, 2021

(54) SYSTEMS AND METHODS FOR THERMOMETRY AND THERANOSTIC APPLICATIONS

(71) Applicant: Board of Regents, The University of Texas System, Austin, TX (US)

(72) Inventors: Baohong Yuan, Arlington, TX (US); Shuai Yu, Mansfield, TX (US); Tingfeng Yao, Arlington, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 355 days.

(21) Appl. No.: 16/304,408

(22) PCT Filed: Jun. 2, 2017

(86) PCT No.: PCT/US2017/035616
§ 371 (c)(1),
(2) Date: Nov. 26, 2018

(87) PCT Pub. No.: WO2017/210520
PCT Pub. Date: Dec. 7, 2017

(65) Prior Publication Data
US 2019/0293498 A1 Sep. 26, 2019

Related U.S. Application Data

(60) Provisional application No. 62/344,472, filed on Jun. 2, 2016.

(51) Int. Cl.
*G01K 11/20* (2006.01)
(52) U.S. Cl.
CPC .................................. *G01K 11/20* (2013.01)

(58) Field of Classification Search
USPC .......................................... 374/161, 131, 120
See application file for complete search history.

(56) References Cited

U.S. PATENT DOCUMENTS

| 6,132,958 | A | 10/2000 | Simon |
| 2007/0093708 | A1* | 4/2007 | Benaron .............. A61B 5/0095 |
| | | | 600/407 |

(Continued)

OTHER PUBLICATIONS

International Search Report and Written Opinion corresponding to International Application No. PCT/US2017/035616, dated Aug. 17, 2017, 7 pages.

*Primary Examiner* — Mirellys Jagan
(74) *Attorney, Agent, or Firm* — J. Clinton Wimbish; Nexsen Pruet, PLLC

(57) ABSTRACT

In one aspect, methods of measuring the temperature of an environment are described herein. In some embodiments, such a method comprises (a) disposing a population of ultrasound-switchable fluorophores in the environment, the population comprising n differing fluorophores having n differing switching threshold temperatures; (b) exposing the environment to an ultrasound beam to create an activation region having a temperature greater than or equal to one or more of the switching threshold temperatures; (c) disposing the fluorophores within the activation region to switch at least one fluorophore from an off state to an on state; (d) exposing the environment to up to n beams of electromagnetic radiation, thereby exciting at least one fluorophore in the on state; (e) detecting up to n photoluminescence signals emitted by the fluorophores; and (f) correlating the photoluminescence signals with up to n temperatures or temperature ranges.

16 Claims, 10 Drawing Sheets

(56) References Cited

U.S. PATENT DOCUMENTS

| | | | |
|---|---|---|---|
| 2007/0189359 A1* | 8/2007 | Chen | G01L 11/02 |
| | | | 374/161 |
| 2008/0033300 A1* | 2/2008 | Hoang | A61B 18/20 |
| | | | 600/474 |
| 2008/0077002 A1* | 3/2008 | Nielsen | A61K 49/225 |
| | | | 600/407 |
| 2011/0098609 A1* | 4/2011 | Hall | G01K 11/16 |
| | | | 601/2 |
| 2013/0034122 A1 | 2/2013 | Lewis et al. | |
| 2013/0037728 A1 | 2/2013 | Kiesel et al. | |
| 2014/0147929 A1 | 5/2014 | Berezin et al. | |
| 2015/0309014 A1 | 10/2015 | Yuan et al. | |

* cited by examiner

SYSTEMS AND METHODS FOR THERMOMETRY AND THERANOSTIC APPLICATIONS

CROSS REFERENCE TO RELATED APPLICATIONS

This application is a national stage application under 35 U.S.C. § 371 of International Application No. PCT/US2017/035616, filed on Jun. 2, 2017, which claims priority pursuant to 35 U.S.C. § 119(e) to U.S. Provisional Patent Application Ser. No. 62/344,472, filed on Jun. 2, 2016, each of which is hereby incorporated by reference in its entirety.

STATEMENT REGARDING FEDERALLY SPONSORED RESEARCH

This invention was made with government support under contract CBET-1253199 awarded by the National Science Foundation and NHARP-13310 awarded by the Texas Higher Education Coordinating Board. The government has certain rights in the invention.

FIELD

This invention relates to systems and methods for thermometry and theranostic applications and, in particular, to such systems and methods using ultrasound-switchable fluorescence (USF).

BACKGROUND

It is highly desirable to image temperature inside biological environments such as living tissue, particularly at acceptable cost and with high accuracy, spatial resolution, temporal resolution, temperature resolution, sensitivity, and dynamic range. Unfortunately, such thermometry has previously been difficult to achieve, particularly in a noninvasive manner within living tissue.

Additionally, thermal therapy of biological environments, including benign and malignant diseases, is now routinely used in a variety of clinical settings via a variety of heating technologies. For example, high intensity focused ultrasound (HIFU), laser, radio frequency (RF) wave, and microwave sources have all been used to heat biological environments such as tissue. HIFU-based thermal therapy is an especially popular, truly noninvasive, and bloodless technology. In this approach, a tightly focused ultrasound pulse with high intensity is typically delivered to the target area to quickly and locally heat tissue up to approximately 60-80° C. or higher, thereby inducing necrosis. Moreover, this approach has been clinically used for the treatment of uterine fibroids, the non-invasive palliative pain treatment of bone metastases, and the treatment of other diseases such as prostate cancer. Therefore, imaging temperature during HIFU thermal therapy is particularly needed. Such imaging could provide an accurate estimate of the thermal dose while also helping avoid damage to normal tissues.

Previously, magnetic resonance imaging (MM) was the only reliable technology that could accurately and noninvasively image HIFU-induced tissue temperature while also providing precise guidance during HIFU treatment. Unfortunately, MRI-based thermometry has many disadvantages. For instance, it is extremely expensive and therefore not widely available. This disadvantage also hinders the widespread use of HIFU treatment. In addition, MRI-based thermometry cannot be used with some patients, such as patients with metal implants, patients who are not comfortable remaining in the MRI machine for several hours, or patients requiring imaging of some lipid-rich tissues (such as fat). MRI-based thermometry is also complicated and requires magnetic compatibility of the heating device. It is also bulky and generally not portable. Further, measuring absolute temperature using MM-based thermometry is difficult. Previous ultrasound-based thermometry also suffers from various disadvantages. For instance, previous ultrasound-based methods of thermometry exhibit a narrow dynamic range (37-50° C.) and cannot be used to reliably estimate tissue temperature above 50° C.

Therefore, there exists a need for improved systems and methods for thermometry, including in conjunction with the therapeutic use of HIFU.

SUMMARY

In one aspect, methods of thermometry and theranostic treatment of tissue are described herein which, in some cases, can provide one or more advantages compared to other methods. For example, in some embodiments, a method described herein can provide similar image quality as MM-based thermometry methods, while also significantly reducing cost, increasing imaging speed, simplifying the operation and measurement mechanisms, and improving portability. In addition, a method described herein can also be intrinsically co-registered with HIFU thermal treatment. Thus, methods described herein can facilitate the widespread use of HIFU-based thermal treatment. Moreover, compared with ultrasound-based thermometry, methods described herein, in some cases, achieve sensitivity to a much larger temperature range, including a range that is suitable for monitoring HIFU thermal treatment. Methods described herein can also noninvasively image and monitor the absolute temperature of biological environments such as tissue. Methods described herein can also be used to guide HIFU-based thermal ablation or hyperthermia therapy. Additionally, methods described herein can be used for patients who cannot use MRI thermometry, patients for whom MM-based thermometry is not accessible, patients requiring longitudinal studies, and patients who have diseases (such as tumors) with a depth of up to about 5 cm from a surface where a catheter or probe can reach (which could include the breast, prostate, cervix, neck and head, and thyroid, among other areas).

A method of thermometry described herein, in some embodiments, comprises (a) disposing a population of ultrasound-switchable fluorophores in the environment, the population comprising a first ultrasound-switchable fluorophore having a first switching threshold temperature; (b) exposing the environment to an ultrasound beam to create an activation region within the environment, the activation region having a temperature greater than or equal to the first switching threshold temperature; (c) disposing the population of fluorophores within the activation region to switch at least one fluorophore of the population from an off state to an on state; (d) exposing the environment to a beam of electromagnetic radiation, thereby exciting at least one fluorophore of the population in the on state; (e) detecting a first photoluminescence signal emitted by the population of fluorophores; and (f) correlating the first photoluminescence signal with a first temperature or temperature range including the first switching threshold temperature.

In addition, in some embodiments, the population of ultrasound-switchable fluorophores further comprises a second ultrasound-switchable fluorophore having a second switching threshold temperature, the second switching threshold temperature being higher than the first switching threshold temperature. Moreover, in some such instances, the activation region has a temperature greater than or equal to the second switching threshold temperature. The method can also comprise (g) detecting a second photoluminescence signal emitted by the population of fluorophores; and (h) correlating the second photoluminescence signal with a second temperature or temperature range including the second switching threshold temperature.

Similarly, in some embodiments of a method described herein, the population of ultrasound-switchable fluorophores further comprises a third ultrasound-switchable fluorophore having a third switching threshold temperature and a fourth ultrasound-switchable fluorophore having a fourth switching threshold temperature, the third switching threshold temperature being higher than the second switching threshold temperature and the fourth switching threshold temperature being higher than the third switching threshold temperature. In some such cases, the activation region has a temperature greater than or equal to the third switching threshold temperature or greater than or equal to the fourth switching threshold temperature. Additionally, the method can further comprise (i) detecting a third photoluminescence signal emitted by the population of fluorophores; (j) correlating the third photoluminescence signal with a third temperature or temperature range including the third switching threshold temperature; (k) detecting a fourth photoluminescence signal emitted by the population of fluorophores; and (l) correlating the fourth photoluminescence signal with a fourth temperature or temperature range including the fourth switching threshold temperature.

More generally, n different ultrasound-switchable fluorophores may be used in a method described herein. Thus, in some embodiments, a method of measuring temperature in an environment described herein comprises (a) disposing a population of ultrasound-switchable fluorophores in the environment, the population comprising n differing ultrasound-switchable fluorophores having n differing switching threshold temperatures; (b) exposing the environment to an ultrasound beam to create an activation region within the environment, the activation region having a temperature greater than or equal to one or more of the n differing switching threshold temperatures; (c) disposing the population of fluorophores within the activation region to switch at least one fluorophore of the population from an off state to an on state; (d) exposing the environment to up to n beams of electromagnetic radiation, thereby exciting at least one fluorophore of the population in the on state; (e) detecting up to n photoluminescence signals emitted by the population of fluorophores; and (f) correlating the up to n photoluminescence signals with up to n temperatures or temperature ranges. Additionally, in some embodiments, the correlation is carried out in a one-to-one manner, wherein an nth photoluminescence signal is correlated with an nth temperature or temperature range including an nth switching threshold temperature. Moreover, n can be any desired integer, such as 2, 3, 4, 5, 6, 7, 8, 9, or 10.

In addition, a method of measuring the temperature of an environment described herein may also be used to provide thermal therapy to the environment, including in a simultaneous manner. For example, in some instances, exposing the environment to an ultrasound beam according to a method described herein also heats the environment. Thus, in some cases, methods described herein are theranostic methods.

These and other embodiments are described in more detail in the detailed description which follows.

DETAILED DESCRIPTION

Figure 1A:
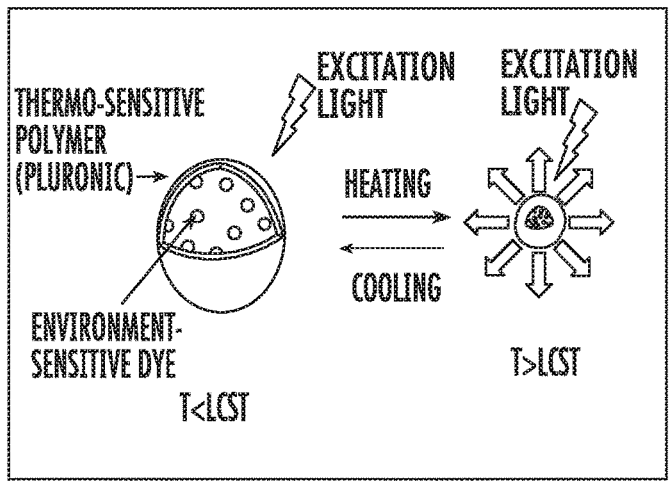
FIG. 1A illustrates schematically a thermal switching event of an ultrasound-switchable fluorophore according to one embodiment described herein.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" or "from 5 to 10" or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

In one aspect, methods of measuring temperature in an environment are described herein. In some embodiments, such a method comprises (a) disposing a population of ultrasound-switchable fluorophores in the environment, the population comprising a first ultrasound-switchable fluorophore having a first switching threshold temperature; (b) exposing the environment to an ultrasound beam to create an activation region within the environment, the activation region having a temperature greater than or equal to the first switching threshold temperature; (c) disposing the population of fluorophores within the activation region to switch at least one fluorophore of the population from an off state to an on state; (d) exposing the environment to a beam of electromagnetic radiation, thereby exciting at least one fluorophore of the population in the on state; (e) detecting a first photoluminescence signal emitted by the population of fluorophores; and (f) correlating the first photoluminescence signal with a first temperature or temperature range including the first switching threshold temperature.

Moreover, in some cases, the population of ultrasound-switchable fluorophores further comprises a second ultrasound-switchable fluorophore having a second switching threshold temperature, the second switching threshold temperature being higher than the first switching threshold temperature. In some such instances, the activation region has a temperature greater than or equal to the second switching threshold temperature. Additionally, in some embodiments, a method described herein further comprises (g) detecting a second photoluminescence signal emitted by the population of fluorophores; and (h) correlating the second photoluminescence signal with a second temperature or temperature range including the second switching threshold temperature. The first and second photoluminescence signals can be detected using the same or different detectors or detection channels. For instance, in some cases, the first and second photoluminescence signals are detected using first and second detection channels.

Additionally, in some embodiments, such a method comprises exposing the environment to a first beam and a second beam of electromagnetic radiation, as opposed to exposing the environment to only one beam of electromagnetic radiation to excite at least one fluorophore in the on state. Moreover, the first and second beams of electromagnetic radiation (which can also be referred to as the first and second excitation beams) can differ from one another in peak emission wavelength, which may be particularly desirable when the first and second ultrasound-switchable fluorophores have differing absorption or excitation profiles. In some cases, the second excitation beam primarily excites the second ultrasound-switchable fluorophore (as compared to exciting the first ultrasound-switchable fluorophore), and the first excitation beam primarily excites the first ultrasound-switchable fluorophore (as compared to exciting the second ultrasound-switchable fluorophore). Further, in some such instances, the first and second excitation beams are not provided to the environment simultaneously but are instead provided sequentially. As described further hereinbelow, sequential excitation beams, in some embodiments, are provided by a single excitation beam source (such as a single pulsed laser) but using differing path lengths for the differing excitation beams, such as may be provided by a plurality of optical fibers having differing lengths. In this manner, detection of the first and second photoluminescence signals can be temporally resolved, whether detected by the same detector or detection channel or by differing detectors or detection channels.

It is also possible to use more than two different ultrasound-switchable fluorophores. For example, in some embodiments, the population of ultrasound-switchable fluorophores further comprises a third ultrasound-switchable fluorophore having a third switching threshold temperature and a fourth ultrasound-switchable fluorophore having a fourth switching threshold temperature. The third switching threshold temperature is higher than the second switching threshold temperature and the fourth switching threshold temperature is higher than the third switching threshold temperature. Additionally, in some cases, the activation region has a temperature greater than or equal to the third switching threshold temperature or greater than or equal to the fourth switching threshold temperature. In such an instance, the method can further comprise (i) detecting a third photoluminescence signal emitted by the population of fluorophores; (j) correlating the third photoluminescence signal with a third temperature or temperature range including the third switching threshold temperature; (k) detecting a fourth photoluminescence signal emitted by the population of fluorophores; and (l) correlating the fourth photoluminescence signal with a fourth temperature or temperature range including the fourth switching threshold temperature.

Additionally, as described above for the use of two fluorophores, such a method can comprise exposing the environment to a third beam of electromagnetic radiation and/or a fourth beam of electromagnetic radiation. One or both of the third and fourth beams of electromagnetic radiation (or third and fourth excitation beams) can excite at least one fluorophore of the population in the on state. For instance, in some cases, the third beam of electromagnetic radiation primarily excites the third ultrasound-switchable fluorophore, and the fourth beam of electromagnetic radiation primarily excites the fourth ultrasound-switchable fluorophore. In some such embodiments, the third and fourth excitation beams are not provided to the environment simultaneously but are instead provided sequentially, relative to one another and/or relative to the first and second excitation beams. In this manner, detection of the first, second, third, and fourth photoluminescence signals can be temporally resolved, whether detected by the same detector or detection channel or by differing detectors or detection channels.

Again, a method described herein is not necessarily limited to four ultrasound-switchable fluorophores. More generally, n different ultrasound-switchable fluorophores may be used in a method described herein. Thus, in some embodiments, a method of measuring temperature in an environment described herein comprises (a) disposing a population of ultrasound-switchable fluorophores in the environment, the population comprising n differing ultrasound-switchable fluorophores having n differing switching threshold temperatures; (b) exposing the environment to an ultrasound beam to create an activation region within the environment, the activation region having a temperature greater than or equal to one or more of the n differing switching threshold temperatures; (c) disposing the population of fluorophores within the activation region to switch at least one fluorophore of the population from an off state to an on state; (d) exposing the environment to up to n beams of electromagnetic radiation, thereby exciting at least one fluorophore of the population in the on state; (e) detecting up to n photoluminescence signals emitted by the population of fluorophores; and (f) correlating the up to n photoluminescence signals with up to n temperatures or temperature ranges, including in a one-to-one manner, wherein an nth photoluminescence signal is correlated with an nth temperature or temperature range including an nth switching threshold temperature. It is further to be understood that n can be any desired integer, such as 2, 3, 4, 5, 6, 7, 8, 9, or 10. Moreover, in some cases, the number n is selected based on a desired total temperature range (or dynamic range) detectable by the method and/or based on a desired number of detection channels.

It is further to be understood that, as a general matter, the foregoing steps (b)-(f) or (d)-(f) may be repeated any desired number of times to measure a temperature according to a method described herein. In such instances, the detected signals can be combined (or binned or integrated) and then further processed, or processed as a function of time to provide a temporal temperature profile, as described further hereinbelow. The repeated steps can also be carried out after moving the activation region to a different location within the environment, such as may be achieved by raster scanning the environment or a portion thereof with the ultrasound beam.

In addition, in some embodiments, the photoluminescent emission signals of individual ultrasound-switchable fluorophores described herein are individually resolved or isolated. Such individual resolution or isolation can be achieved by selectively exciting a given ultrasound-switchable fluorophore and/or by selectively detecting the emission of the given ultrasound-switchable fluorophore (as opposed to exciting and/or detecting the emission of other ultrasound-switchable fluorophores). For example, in some cases, exposing the environment to a beam of electromagnetic radiation comprises exposing the environment to a first excitation beam and a second excitation beam, wherein the first excitation beam and the second excitation beam have differing wavelength maxima. Additionally, the first excitation beam primarily excites the first ultrasound-switchable fluorophore, and the second excitation beam primarily excites the second ultrasound-switchable fluorophore. Further, in some cases, the first and second excitation beams are provided to the environment sequentially or non-simultaneously.

In some such embodiments, the first photoluminescence signal is primarily associated with or correlated to photoluminescence of the first ultrasound-switchable fluorophore, and the second photoluminescence signal is primarily associated with or correlated to photoluminescence of the second ultrasound-switchable fluorophore. Further, in some such embodiments, the first and second photoluminescence signals are detected using differing detectors or detection channels, and the detectors or detection channels are turned on or off in accordance with the sequence of the excitation beams, such that a given detector or detection channel is operable to receive and process a photoluminescence signal (i.e., is "on") or not (i.e., is "off") only or primarily only from a desired fluorophore, namely, the fluorophore primarily excited by the desired excitation beam. For instance, in some cases, the first photoluminescence signal is detected with a first detector or detection channel, and the second photoluminescence signal is detected with a second detector or detection channel. Moreover, the first detector or detection channel is off when the second photoluminescence signal is detected, and the second detector or detection channel is off when the first photoluminescence signal is detected.

It is to be understood that the foregoing principle can be extended to n ultrasound-switchable fluorophores, n photoluminescence signals, and n detectors or detection channels. For instance, in some embodiments, exposing the environment to a beam of electromagnetic radiation comprises exposing the environment to n excitation beams, wherein the n excitation beams have differing wavelength maxima, wherein the nth excitation beam primarily excites the nth ultrasound-switchable fluorophore, and wherein the n excitation beams are provided to the environment sequentially or non-simultaneously. Moreover, in some such cases, n photoluminescent signals are detected with n differing detectors or detection channels, and each nth photoluminescence signal is primarily associated with or correlated to photoluminescence of the nth ultrasound-switchable fluorophore. Further, the n detectors or detection channels are turned on or off in accordance with the sequence of the excitation beams, such that each nth detector or detection channel is on when the nth photoluminescence signal is to be detected (or when the nth fluorophore is primarily excited) and off when the nth photoluminescence signal is not to be detected (or when the nth fluorophore is not primarily excited). As described above, n can be any desired integer, such as 2, 3, 4, 5, 6, 7, 8, 9, or 10.

Moreover, it is further to be understood that it is also possible for n ultrasound-switchable fluorophores to be used, but for less than n detectors or detection channels (and/or less than n excitation beams or excitation sources) to be used (provided n is at least 2). In such instances, the detectors or detection channels (and/or excitation beams or excitation sources) can be shared and/or used in an alternating or other temporally resolved manner.

Resolution or isolation of individual photoluminescence signals primarily associated with individual ultrasound-switchable fluorophores can be further achieved or improved, if needed, by using excitation and/or emission filters for one or more excitation beams and/or one or more detectors or detection channels, as described further hereinbelow. It is also possible to deconvolute or resolve individual photoluminescence signals primarily associated with individual ultrasound-switchable fluorophores by carrying out one or more signal processing steps, as described further hereinbelow and/or as known to one of ordinary skill in the art. For example, in some cases, multivariate curve resolution is used, as described in Xu et al., "In-vivo fluorescence imaging with a multivariate curve resolution spectral unmixing technique," *J. Biomed. Opt.* 14 (2009).

Moreover, a method of measuring the temperature of an environment described herein may also be used to provide thermal therapy to the environment, including in a simultaneous manner. For example, in some cases, exposing the environment to an ultrasound beam also heats the environment. Thus, in some embodiments, methods described herein are theranostic methods. However, it is also possible to heat an environment whose temperature is measured in a manner described herein other than with the ultrasound beam used for thermometry. For example, in some cases, microwaves or radio frequency (RF) waves can be used to heat the environment. Other methods may also be used. Moreover, in some such cases, the activation region described above (which is generally a region of increased temperature) may be provided (or primarily provided) by the alternative method of heating the environment, rather than being provided (or primarily provided) by the ultrasound beam.

Turning now to specific steps of methods, methods described herein comprise disposing a population of ultrasound-switchable fluorophores in an environment. Any environment not inconsistent with the objectives of the present disclosure may be used. In some embodiments, the environment is a biological environment. An environment of a method described herein may also be a non-biological environment. In some cases, for example, a biological environment is an in vivo environment, such as a tissue, organ, blood vessel, or other portion of a living organism. In some embodiments, the biological environment comprises a tumor or tumor vasculature. In other cases, a biological environment comprises an in vitro environment, such as a tissue culture. The biological environment of a method described herein can also comprise or be replaced by a biological phantom material or tissue-mimicking phantom material, such as an agar, silicone, polyvinyl alcohol (PVA) gel, polyacrylamide (PAA) gel, or a dispersion of an oil in gelatin. Other phantom materials may also be used.

Moreover, in some embodiments, a biological environment comprises deep tissue. "Deep" tissue, for reference purposes herein, comprises tissue (or, in the case of a phantom material, an interior region of the phantom material) that is located at least about 1 cm below the exterior or outer surface of the organism, tissue culture, or other larger structure associated with the biological environment (such as, in the case of a phantom material, the outer surface of the phantom material). In some embodiments, for instance, deep tissue is located between about 1 cm and about 10 cm or between about 1 cm and about 5 cm below an outer surface. In some cases, deep tissue is located more than 10 cm below an outer surface. Further, an outer surface, in some embodiments, comprises the surface of the skin of an organism.

In addition, any ultrasound-switchable fluorophore or combination of differing ultrasound-switchable fluorophores not inconsistent with the objectives of the present disclosure may be used. An "ultrasound-switchable" fluorophore, for reference purposes herein, comprises a fluorophore operable to switch between an on state and an off state in response to exposure to an ultrasound beam. The ultrasound beam can be either directly or indirectly responsible for the switching response of the fluorophore. For example, in some cases, the ultrasound beam interacts directly with the fluorophore, resulting in a switch between fluorescence states of the fluorophore. In other cases, the ultrasound beam interacts directly with the immediate environment or microenvironment of the fluorophore and changes at least one property of the fluorophore's microenvironment. In such cases, the fluorophore can switch between on and off fluorescence states in response to the environmental change induced by the ultrasound beam. Thus, the fluorophore can be indirectly switchable in response to exposure to an ultrasound beam.

The "on" state of a fluorophore, for reference purposes herein, comprises either (1) a state at which the fluorescence intensity of the fluorophore is relatively high compared to the "off" state of the fluorophore, at which the fluorescence intensity is relatively low (assuming the fluorophore is similarly excited in both the on state and the off state); or (2) a state at which the fluorescence lifetime of the fluorophore is relatively long compared to the "off" state of the fluorophore, at which the fluorescence lifetime is relatively short (again assuming the fluorophore is similarly excited). Further, in both cases, the on and off states substantially define a step function in the fluorescence intensity or lifetime profile when plotted as a function of a critical switching parameter such as temperature. A fluorophore having a longer lifetime in an on state than an off state can be particularly suitable for use in methods described herein using time-gated or time-delayed detection of emitted photons from fluorophores, such as time-gated detection in which only those photons received after a relatively long delay following excitation are counted by the detector as part of the USF signal. In some cases, the on state of a fluorophore exhibits at least about 70 percent, at least about 80 percent, or at least about 90 percent of the theoretical maximum fluorescence intensity of the fluorophore, and the off state of the fluorophore exhibits no more than about 50 percent, no more than about 30 percent, no more than about 10 percent, or no more than about 5 percent of the theoretical maximum fluorescence intensity of the fluorophore.

The physical cause for the existence of an on state versus an off state can vary. For example, in some cases, the fluorescence intensity or fluorescence lifetime of a fluorophore changes dues to a conformational or chemical change of the fluorophore in response to a change in environmental conditions, such as exhibited by some thermoresponsive polymers, pH-sensitive chemical species, or pressure sensitive materials. In some cases, the fluorescence intensity or fluorescence lifetime of a fluorophore changes in response to internal fluorescence quenching, wherein such quenching can be directly or indirectly induced by the presence of ultrasound.

For example, in some embodiments, a fluorophore described herein comprises a FRET (Förster or fluorescence resonance energy transfer) donor species and a FRET acceptor species, and the distance between the FRET donor species and the FRET acceptor species is altered by the presence of an ultrasound beam. The FRET donor species can be a first fluorescent species or other chromophore, and the FRET acceptor species can be a second fluorescent species or other chromophore. In such cases, as understood by one of ordinary skill in the art, FRET energy transfer between the donor species and the acceptor species can result in quenching of the fluorescence of the donor species. Thus, the acceptor species can be considered to be a fluorescence quenching species of the fluorophore. Any donor-acceptor pair not inconsistent with the objectives of the present disclosure may be used in FRET-based fluorophores described herein. For example, in some cases, the donor species comprises Alexa Fluor 546 and the acceptor species comprise Alexa Fluor 647. Other combinations of acceptor species and donor species are also possible.

In addition, in some embodiments, a fluorophore described herein comprises a thermoresponsive polymer. A "thermoresponsive" polymer, for reference purposes herein, comprises a polymer having a physical or chemical property that changes in a temperature-dependent manner, wherein the change is a discontinuous or binary change. For example, in some cases, the physical conformation or polarity of a thermoresponsive polymer changes in a temperature-dependent manner, and the thermoresponsive polymer exhibits a first conformation below a threshold temperature and a second, substantially different conformation above the threshold temperature. In some embodiments, for instance, a thermoresponsive polymer exhibits an expanded coil or chain confirmation below a threshold temperature and exhibits a compact or globular conformation above the threshold temperature. In some such cases, the threshold temperature can be referred to as the "lower critical solution temperature" (LCST) of the polymer.

Any thermoresponsive polymer not inconsistent with the objectives of the present disclosure may be used. In some embodiments, a thermoresponsive polymer comprises a poly(N-isopropylacrylamide) or a copolymer of N-isopropylacrylamide with one or more of acrylamide, N-tert-butylacrylamide, acrylic acid, and allylamine. In other cases, a thermoresponsive polymer comprises a poly(N-vinylcaprolacatam) (PVCL) or a poloxamer such as a Pluronic polymer. Other thermoresponsive polymers may also be used.

Additionally, in some cases, a thermoresponsive polymer of a fluorophore described herein comprises one or more fluorescent moieties or is conjugated to one or more fluorescent species, such as one or more fluorescent dye molecules. The thermoresponsive polymer can be conjugated to the fluorescent species in any manner not inconsistent with the objectives of the present disclosure. For example, in some cases, a thermoresponsive polymer is coupled to a fluorescent species through one or more covalent bonds such as one or more ester bonds or one or more amide bonds.

Some non-limiting examples of an ultrasound-switched fluorescence process using a thermoresponsive fluorophore are illustrated in U.S. Patent Application Publication No. 2015/0309014 to Yuan et al. (hereinafter "the '014 publication"). As described in the '014 publication, a thermoresponsive polymer can be conjugated to a fluorescent species to provide a fluorophore. The fluorophore has a chain conformation and a globular conformation described hereinabove, and the conformation is temperature-dependent. Further, the transition from one conformation to the other results in a change in the fluorescence intensity or lifetime of the fluorescent species. As described further herein, the change in fluorescence intensity or lifetime can be due to differences in the microenvironment of the fluorescent species when the polymer is in the chain conformation compared to the globular conformation. For example, in some cases, the polarity and/or viscosity of the polymer environment experienced by the fluorophore changes depending on whether the polymer is in the chain conformation or the globular conformation.

Further, in some embodiments, a fluorophore described herein comprises a fluorescent material dispersed in and/or attached to the surface of a thermoresponsive polymer nanoparticle. Moreover, the fluorescence properties of the fluorescent material can be dependent on a change of the conformation, polarity, or other physical or chemical property of the polymer nanoparticle. In addition, the property change can be a temperature-dependent change. In this manner, a change in temperature of the thermoresponsive polymer nanoparticle can result in a change in fluorescence intensity and/or lifetime of the fluorescent material, including a change between an on state of the fluorescent material and an off state of the fluorescent material.

For example, in some embodiments, a thermoresponsive polymer nanoparticle can exhibit a temperature-dependent polarity, and the fluorescent material dispersed in the nanoparticle can exhibit a polarity-dependent fluorescence intensity and/or lifetime. Thus, a change in the temperature of the nanoparticle can result in a change in the fluorescence intensity and/or lifetime of the fluorophore.

In another exemplary embodiment, a thermoresponsive polymer nanoparticle can have a hydrophilic interior below a threshold temperature and a hydrophobic interior above the threshold temperature. Thus, such a nanoparticle can exhibit a temperature-dependent size when dispersed in a polar or non-polar solvent. For example, when dispersed in water or another polar solvent below the threshold temperature, the nanoparticle can exhibit a larger size due to the presence of water in the hydrophilic interior of the nanoparticle. Similarly, above the threshold temperature, the nanoparticle can exhibit a smaller size due to the exclusion of water from the now hydrophobic interior of the nanoparticle. In this manner, a fluorescent material dispersed in the nanoparticle can have a temperature-dependent concentration, which can result in temperature-dependent fluorescence properties of the overall fluorophore. This process is illustrated schematically in the '014 publication, specifically in FIG. 2.

In yet another exemplary embodiment, an ultrasound-switchable fluorophore is formed by incorporating a fluorescent material such as a fluorescent dye within the interior of a polymeric nanoparticle or micelle, such that the polymeric nanoparticle or micelle acts as a nanocapsule for the fluorescent material. Moreover, the polymeric nanoparticle can be formed from a thermoresponsive polymer, such as a thermoresponsive polymer described hereinabove. Non-limiting examples of polymers suitable for forming nanocapsules described herein include Pluronic F127, Pluronic F98, poly(N-isopropylacrylamide) (PNIPAM), and copolymers of PNIPAM with acrylamide (AAm) or N-tert-butylacrylamide (TBAm). Moreover, in some instances, a nanoparticle or nanocapsule can be formed by copolymerizing a thermoresponsive polymer described hereinabove with a polyethylene glycol (PEG) and/or by conjugating a PEG as a pendant group to a thermoresponsive polymer. Such a fluorophore, in some cases, can have a switching threshold that is controlled at least in part by the inclusion of PEG, as described further in the '014 publication.

A polymer nanoparticle such as a thermoresponsive polymer nanoparticle or a polymer nanocapsule described herein can have any size or shape not inconsistent with the objectives of the present disclosure. In some embodiments, for instance, a thermoresponsive polymer nanoparticle is substantially spherical and has a diameter between about 10 nm and about 300 nm, between about 50 nm and about 250 nm, between about 50 nm and about 200 nm, or between about 70 nm and about 150 nm. In some cases, a polymer nanocapsule is substantially spherical and has a diameter of less than about 100 nm or less than about 50 nm. In some instances, a polymer nanocapsule has a size between about 20 nm and about 90 nm, between about 20 nm and about 80 nm, or between about 20 nm and about 70 nm. Other sizes and shapes are also possible.

Further, any fluorescent material not inconsistent with the objectives of the present disclosure may be dispersed in and/or attached to a thermoresponsive polymer nanoparticle or other polymer nanoparticle to form a fluorophore described herein.

Non-limiting examples of fluorescent materials suitable for use in some embodiments described herein include organic dyes such as N,N-dimethyl-4-benzofurazansulfonamide (DBD); 4-(2-Aminoethylamino)-7-(N,N-dimethyl sulfamoyl)benzofurazan (DBD-ED); indocyanine green (ICG); a Dylight-700 such as Dylite-700-2B; IR-820; 3,3'-Diethylthiatricarbocyanine iodide (DTTCI); LS-277; LS-288; a cypate; a rhodamine dye such as rhodamine 6G or rhodamine B; or a coumarin. In some instances, a fluorescent material comprises an azadipyrromethene. In addition, in some cases, a fluorescent material comprises an inorganic species such as a semiconductor nanocrystal or quantum dot, including a II-VI semiconductor nanocrystal such as ZnS or CdSe or a III-V semiconductor nanocrystal such as InP or InAs. In other instances, a fluorescent material comprises a Lanthanide species. Additional non-limiting examples of fluorescent materials suitable for use in an ultrasound-switchable fluorophore described herein include the fluorescent materials described in Amin et al., "Syntheses, Electrochemistry, and Photodynamics of Ferrocene-Azadipyrromethane Donor-Acceptor Dyads and Triads," *J. Phys. Chem. A* 2011, 115, 9810-9819; Bandi et al., "A Broad-Band Capturing and Emitting Molecular Triad: Synthesis and Photochemistry," *Chem. Commun.*, 2013, 49, 2867-2869; Jokic et al., "Highly Photostable Near-Infrared Fluorescent pH Indicators and Sensors Based on $BF_2$-Chelated Tetraarylazadipyrromethane Dyes," *Anal. Chem.* 2012, 84, 6723-6730; Jiang et al., "A Selective Fluorescent Turn-On NIR Probe for Cysteine," *Org. Biomol. Chem.*, 2012, 10, 1966-1968; and Kucukoz et al., "Synthesis, Optical Properties and Ultrafast Dynamics of Aza-boron-dipyrromethane Compounds Containing Methoxy and Hydroxy Groups and Two-Photon Absorption Cross-Section," *Journal of Photochemistry and Photobiology A: Chemistry* 247 (2012), 24-29; the entireties of which are hereby incorporated by reference. Other fluorescent materials may also be used.

An ultrasound-switchable fluorophore described herein can have any fluorescence emission profile not inconsistent with the objectives of the present disclosure. For example, in some embodiments, a fluorophore exhibits an emission profile including visible light or centered in the visible region of the electromagnetic spectrum, such as between 450 nm and 750 nm. In some cases, a fluorophore exhibits an emission profile including infrared (IR) light or centered in the IR region of the electromagnetic spectrum. For example, in some instances, a fluorophore described herein exhibits an emission profile centered in the near-IR (NIR, 750 nm-1.4 μm), short-wavelength IR (SWIR, 1.4-3 μm), mid-wavelength IR (MWIR, 3-8 μm), or long-wavelength IR (LWIR, 8-15 μm). Moreover, in some embodiments, a fluorophore described herein has an emission profile overlapping with a wavelength at which water and/or biological tissue has an absorption minimum, such as a wavelength between about 700 nm and about 800 nm or between about 1.25 μm and about 1.35 μm. Additionally, in some cases, a population of ultrasound-switchable fluorophores described herein comprises fluorophores having differing emission profiles. For example, in some cases, a first fluorophore of the population can emit in the NIR and a second fluorophore of the population can emit in the visible region of the electromagnetic spectrum. Moreover, in some instances, a first fluorophore and a second fluorophore can have differing temporal intensity decay profiles, as described further hereinbelow. In some embodiments, the ultrasound fluorescence emission profiles of a first fluorophore and a second fluorophore are mathematically orthogonal or non-correlated.

Further, in some instances, a fluorophore described herein exhibits a fluorescence lifetime of at least about 1 ns, at least about 3 ns, or at least about 10 ns. In some embodiments, a fluorophore described herein exhibits a fluorescence lifetime between about 1 ns and about 15 ns, between about 1 ns and about 10 ns, between about 1 ns and about 4 ns, between about 3 ns and about 7 ns, between about 3 ns and about 5 ns, or between about 10 ns and about 15 ns.

Additionally, in some embodiments, an ultrasound-switchable fluorophore described herein exhibits one or more desirable features related to the on and off states of the fluorophore. For example, in some cases, a fluorophore exhibits a high on-to-off ratio in fluorescence intensity ($I_{On}/I_{Off}$), a high on-to-off ratio in fluorescence lifetime ($\tau_{On}/\tau_{Off}$), a sharp transition bandwidth between on and off states ($T_{BW}$), and/or an adjustable switching threshold ($S_{th}$), such as an adjustable switching threshold temperature ($T_{th}$). These metrics can be further described with reference to the '014 publication, in particular to FIG. 3 of the '014 publication.

FIG. 3 of the '014 publication illustrates plots of the fluorescence intensity and fluorescence lifetime of a temperature-dependent fluorophore as a function of temperature. With reference to the '014 publication, $T_{th}$ refers to the switching threshold temperature. $I_{On}/I_{Off}$ refers to the ratio of the average fluorescence intensity of the fluorophore over a range of temperatures above the threshold temperature to the average fluorescence intensity of the fluorophore over a range of temperatures below the threshold temperature. Similarly, $\tau_{On}/\tau_{Off}$ refers to the ratio of the average fluorescence lifetime of the fluorophore over a range of temperatures above the threshold temperature to the average fluorescence lifetime of the fluorophore over a range of temperatures below the threshold temperature. In some embodiments, the averages are taken over a range of temperatures having a magnitude that is about 5 percent to about 100 percent of the magnitude of the switching threshold value but that lie outside of the transition bandwith $T_{BW}$. As used herein, $T_{BW}$ refers to the range of temperature values over which the fluorophore switches from the on state to the off state in the manner of a step function. In other words, $T_{BW}$ refers to the width of the step between the on and off states. The smaller the $T_{BW}$, the more the fluorescence intensity profile of the fluorophore resembles a true step function having a discontinuity between the on state and the off state. In FIG. 3 of the '014 publication, the $I_{On}$ value is taken as the average intensity over a temperature range of about 33° C. to about 48° C. (a range of about 16° C., or about 62 percent of the $T_{th}$ value of 26° C.) and the $I_{Off}$ value is taken as the average intensity over a temperature range of about 23° C. to about 25° C. (a range of about 3° C., or about 12 percent of the $T_{th}$ value of 26° C.). In general, the range of temperature values used for determining the average fluorescence intensity in the on and off states can be based on the range of temperature values of interest for a particular imaging application. An ultrasound-switchable fluorophore described herein can exhibit any of the $I_{On}/I_{Off}$, $\tau_{On}/\tau_{Off}$, $T_{BW}$, and $T_{th}$ values provided in Table I of the '014 publication.

More generally, any temperature sensitive, ultrasound-switchable fluorophore described in the '014 publication not inconsistent with the objectives of the present disclosure may be used in a method described herein. Other ultrasound-switchable fluorophores may also be used.

Moreover, the fluorophores of a method described herein can span any total temperature range not inconsistent with the objectives of the present disclosure. In some cases, for example, the total temperature range is a temperature range suitable for thermal ablation therapy, such as 50-90° C. In other embodiments, the total temperature range is a temperature range suitable for hyperthermia therapy, such as 37-45° C. It is further to be understood that within a given total temperature range (e.g., 60-80° C.), the temperature ranges of the fluorophores used in the method can be distributed as desired to cover the full range, including in a continuous manner that avoids gaps. Some non-limiting examples of temperature ranges over which some ultrasound-switchable fluorophores are sensitive are provided in Table I below. In Table I, the temperature range of a given fluorophore corresponds to the transition bandwidth $T_{BW}$ of the fluorophore between on and off states. More specifically, the lower value in the temperature range of a given fluorophore is the switching threshold temperature of the ultrasound-switchable fluorophore. The higher value in the temperature range defines the upper boundary of the transition bandwidth. The nomenclature for the ultrasound-switchable fluorophores in Table I is as follows. A given luminescent species (such as a fluorescent dye) was coupled to or encapsulated within a thermoresponsive polymer, polymer nanocapsule, or polymer nanoparticle in a manner similar to that described in the '014 publication. Such fluorophores are denoted using the general nomenclature ADP OH Bottom@5% pluronic F-127, where the species preceding the symbol "@" is the luminescent species, the species following the symbol "@" is the thermoresponsive polymer, and the percentage following the symbol "@" is the amount of thermoresponsive polymer used.

TABLE I

Temperature Ranges for Some Ultrasound-Switchable Fluorophores

| Ultrasound-Switchable Fluorophore | Temperature Range |
|---|---|
| ADP OH Bottom @ 5% pluronic F-127 | 20-24° C. |
| ADP OH Bottom @ 1% pluronic F-127 | 24-30° C. |
| ADP OH Bottom @ 5% pluronic F-98 | 28-36° C. |
| ADP OH Top @ 10% pluronic F-68 | 35-50° C. |
| ADP OH Top @ 5% pluronic F-68 | 48-56° C. |
| ADP OH Top @ 1% pluronic F-68 | 56-66° C. |
| ADP OH Top @ 1% pluronic F-38 | 66-79° C. |
| ADP OH Top @ 0.2% pluronic F-38 | 76-84° C. or greater |

Additionally, it is to be understood that the temperature range over which a given ultrasound-switchable fluorophore is sensitive can be selected based on the identity and/or amount of the temperature-sensitive component (e.g., the thermoresponsive polymer or nanoparticle) of the ultrasound-switchable fluorophore, as described further hereinbelow. Moreover, it is further to be understood that a given luminescent component of the ultrasound-switchable fluorophore can be used with other temperature-sensitive components. In general, any combination of luminescent component and temperature-sensitive component not inconsistent with the objectives of the present disclosure may be used, as described further hereinbelow.

As described above, the n ultrasound-switchable fluorophores used in a method described herein can also have differing absorption and/or emission profiles. For example, in some cases, a first ultrasound-switchable fluorophore has a first luminescent emission maximum and a second ultrasound-switchable fluorophore has a second luminescent emission maximum differing from the first luminescent emission maximum. Further, in some instances, the difference in wavelength ($\Delta\lambda$) between the first luminescent emission maximum and the second luminescent emission maximum is selected based on desired detection channels, the difference in switching threshold temperature ($\Delta T_{th}$) between the first and second fluorophores, and/or the difference in photoluminescent quantum yield ($\Delta QY$) or brightness between the first and second fluorophores, where the "brightness" of a given fluorophore refers to the product of the fluorophore's quantum yield and absorption cross-section at a given excitation wavelength.

In some embodiments, for example, a method described herein uses four differing ultrasound-switchable fluorophores, wherein the fluorophores have increasing switching threshold temperatures such that the first fluorophore has the lowest switching threshold temperature and the fourth fluorophore has the highest switching threshold temperature, and wherein the luminescent emission maxima of the fluorophores also increase in the same order, such that the first luminescent emission maximum is the shortest and the fourth luminescent emission maximum is the longest. Alternatively, in other instances, the order of luminescent emission maxima is reversed. In still other embodiments, the luminescent emission maxima are selected such that the average $\Delta\lambda$, between fluorophores having adjacent switching temperature thresholds is maximized, or such that a specific $\Delta\lambda$ between adjacent fluorophores has a desired value, where "adjacent" fluorophores are again understood to refer to fluorophores having switching temperature thresholds that define a temperature range (which may be denoted, for instance, as $\Delta T_{th, 1-2}$ for a range between a first switching threshold temperature and a second switching threshold temperature) that does not include a switching threshold temperature of any other ultrasound-switchable fluorophore used in the method. In some cases, the $\Delta\lambda$, between one or more pairs of adjacent fluorophores is 30-50 nm. Selecting the luminescent emission maxima and the switching threshold temperatures in this manner, in some instances, can provide improved resolution of the individual emission profiles of the fluorophores, including in a manner described hereinbelow.

Methods described herein also comprise exposing an environment such as a biological environment to one or more ultrasound beams to create an activation region within the environment. The ultrasound beam can have any ultrasound frequency not inconsistent with the objectives of the present disclosure. In some embodiments, an ultrasound beam comprises an oscillating sound pressure wave with a frequency of greater than about 20 kHz or greater than about 2 MHz. In some cases, an ultrasound beam described herein has a frequency of up to about 5 GHz or up to about 3 GHz. In some embodiments, an ultrasound beam has a frequency between about 20 kHz and about 5 GHz, between about 50 kHz and about 1 GHz, between about 500 kHz and about 4 GHz, between about 1 MHz and about 5 GHz, between about 2 MHz and about 20 MHz, between about 2 MHz and about 10 MHz, between about 5 MHz and about 200 MHz, between about 5 MHz and about 15 MHz, between about 200 MHz and about 1 GHz, between about 500 MHz and about 5 GHz, or between about 1 GHz and about 5 GHz.

In addition, an ultrasound beam can have any power not inconsistent with the objectives of the present disclosure. In some embodiments, for instance, an ultrasound beam has a power between about 0.1 W/cm$^2$ and about 10 W/cm$^2$, between about 0.1 W/cm$^2$ and about 5 W/cm$^2$, between about 0.5 W/cm$^2$ and about 5 W/cm$^2$, between about 1 W/cm$^2$ and about 10 W/cm$^2$, or between about 1 W/cm$^2$ and about 5 W/cm$^2$. In other cases, an ultrasound beam has a power between about 100 W/cm$^2$ and about 5000 W/cm$^2$, or between about 100 W/cm$^2$ and about 3000 W/cm$^2$. In some cases, the use of an ultrasound beam having a high power, such as a power described herein, can result in the generation of non-linear effects within the activation region. Moreover, in some embodiments, the effective size of the activation region can be reduced in this manner, leading to improved imaging resolution.

An environment can be exposed to an ultrasound beam in any manner not inconsistent with the objectives of the present disclosure. For example, in some embodiments, a biological environment is exposed to an ultrasound beam described herein for only a limited duration. In some cases, for instance, the ultrasound beam is provided to the environment for less than about 1 second or less than about 500 ms. In some embodiments, the ultrasound beam is provided to the environment for less than about 300 ms, less than about 100 ms, less than about 50 ms, or less than about 10 ms. In some cases, the ultrasound beam is provided to the environment for about 1 ms to about 1 second, about 1 ms to about 500 ms, about 1 ms to about 300 ms, about 1 ms to about 100 ms, about 1 ms to about 50 ms, about 1 ms to about 10 ms, about 10 ms to about 300 ms, about 10 ms to about 100 ms, about 10 ms to about 50 ms, or about 50 ms to about 100 ms. The use of short exposure times of a biological environment to an ultrasound beam, in some embodiments, can permit the time-gating of fluorescence signals, such that a desired USF signal can be temporally separated from one or more undesired or non-analyte fluorescence signals, such as a tissue autofluorescence signal or a signal from a randomly switched-on fluorophore.

Moreover, the ultrasound beam can be a continuous wave beam or a pulsed or modulated beam. The use of a modulated or pulsed ultrasound beam, in some embodiments, can further improve the signal to noise ratio (SNR) of a method described herein by permitting frequency-gated detection of the USF signal. For example, in some cases, a pulsed or modulated ultrasound beam provides an ultrasound exposure having a specific frequency or modulation. As a result, the corresponding USF signal can also exhibit the same specific frequency or modulation. Thus, in some such cases, a lock-in amplifier is used to increase the sensitivity of the detector to the specific frequency or modulation, thus increasing the overall sensitivity and SNR of the method. The use of a modulated ultrasound beam can also improve the temperature resolution of a method described herein, as described further hereinbelow.

In some embodiments of methods described herein, a single ultrasound beam is directed toward the environment using a single ultrasound transducer, such as a high intensity focused ultrasound (HIFU) transducer. In other instances, a plurality of ultrasound beams is directed toward the environment using a plurality of ultrasound transducers. Moreover, in some cases, a first ultrasound beam is directed toward the environment at a first angle and/or from a first direction, and a second ultrasound beam is directed toward the environment at a second angle and/or from a second direction differing from the first angle and/or direction. In some embodiments, for instance, the first and second directions are orthogonal or substantially orthogonal directions, such as directions separated by 80 to 100 degrees. In other cases, the directions are separated by less than 80 degrees or more than 100 degrees. Further, if desired, additional ultrasound beams may also be directed toward the environment from additional directions or at additional angles. In such cases, the focal zones of the beams can overlap or intersect with one another to form an activation region at the intersection of the beams. In this manner, an activation region can have a smaller volume or cross section than the focal zone or cross section of a single ultrasound beam used to generate the activation region, thereby improving imaging resolution. In some cases, for instance, the activation region has a lateral dimension and/or an axial dimension of less than about 2 mm, less than 1.5 mm, or less than about 1 mm. In some embodiments, the activation region has a lateral dimension and/or an axial dimension of less than about 700 µm or less than about 500 µm. In some embodiments, the activation region has a lateral dimension and/or an axial dimension of about 300 µm to about 2 mm, about 400 µm to about 1.5 mm, about 400 µm to about 1 mm, about 400 µm to about 700 µm, or about 400 µm to about 500 µm. In some cases, the lateral and axial dimensions both have a size recited herein, including a size below about 1 mm or below about 700 µm. Moreover, in some embodiments, the lateral and axial dimensions of the activation region are different, thereby providing a relatively anisotropic activation region. Alternatively, in other instances, the lateral and axial dimensions are substantially the same, thereby providing a relatively "square" or isotropic activation region.

An "activation region," for reference purposes herein, comprises a region of the environment in which ultrasound-switchable fluorophores described herein are or can be switched from an off state to an on state. For example, in some cases, an activation region comprises a region of high temperature compared to other portions of the environment. Moreover, as described further herein, the size, shape, and/or other properties of the activation region can be determined by the number and/or power of the one or more ultrasound beams used to form the activation region. In some cases, for instance, the size and shape of an activation region is defined by the focal zone of a single ultrasound beam. In other cases, an activation region is defined by the overlap of the focal zones of a plurality of ultrasound beams.

A fluorophore described herein can be disposed within an activation region in any manner not inconsistent with the objectives of the present disclosure. In some cases, a fluorophore enters or is disposed within an activation region of an environment by diffusing into the activation region from an adjacent area of the environment. In other instances, an activation region is created within a specific location within an environment where it is known that a fluorophore or population of fluorophores is likely to be found or may be found. For example, in some embodiments, an ultrasound beam described herein is raster scanned across or within an environment, thereby producing a plurality of activation regions in different locations within the environment in a sequential manner.

Methods described herein also comprise exposing an environment to a beam of electromagnetic radiation and/or exciting at least one fluorophore in an on state with a beam of electromagnetic radiation. A fluorophore can be excited with a beam of electromagnetic radiation in any manner not inconsistent with the objectives of the present disclosure. In some embodiments, for instance, a fluorophore is excited using a laser excitation source such as a diode laser. In other instances, a fluorophore is excited using one or more light emitting diodes (LEDs) or a broadband excitation source. Moreover, an excitation source described herein can provide any wavelength of light not inconsistent with the objectives of the present disclosure. In some embodiments, a fluorophore described herein is excited with a beam of electromagnetic radiation comprising visible light, NIR light, or IR light. In other cases, the beam of electromagnetic radiation comprises ultraviolet (UV) light.

Methods described herein also comprise detecting a photoluminescence signal or other light emitted within an environment or within a specific location within an environment. In some embodiments, for instance, a method comprises detecting light emitted by at least one ultrasound-switchable fluorophore. Light emitted by the fluorophore can be detected in any manner not inconsistent with the objectives of the present disclosure. In some embodiments, for example, detecting light emitted by at least one fluorophore in an on state comprises detecting the light in a time-gated or frequency-gated manner, including a time-gated manner or frequency-gated manner described herein. In some cases, the light emitted by the at least one fluorophore in the on state is detected after a time delay that is longer than the fluorescence lifetime of the fluorophore in the off state or longer than the fluorescence lifetime of another species present in the biological environment. For example, in some embodiments, the light emitted by the at least one fluorophore in the on state is detected after a time delay that is longer than the autofluorescence lifetime of a non-fluorophore species present in the biological environment, such as the autofluorescence lifetime of tissue, which may be up to about 4 ns or up to about 5 ns.

In addition, the photoluminescence signals of a method described herein can be detected using any detector configuration not inconsistent with the objectives of the present disclosure. In some embodiments, for instance, a photoluminescence signal is detected using a detector comprising a plurality of optical fiber collectors coupled to a camera or photon counter, such as a charge coupled device (CCD) or a photomultiplier tube (PMT). Further, in some cases, the optical fiber collectors are spatially distributed around the environment or around a detection surface of the environment (such as skin or another exterior surface of the environment). Any desired number of optical fiber collectors can be used. In some embodiments, up to 30, up to 20, or up to 10 optical fiber collectors are used. In some cases, 4-30, 4-20, 6-30, 6-20, 8-30, 8-20, 10-30, or 10-20 optical fiber collectors are used. Other configurations are also possible.

Additionally, in some cases, a plurality of photoluminescence signals at a plurality of locations within an environment is detected by raster scanning the environment. Such raster scanning can include raster scanning of one or more ultrasound beams across or within the environment, such that the ultrasound beam sequentially generates a series of activation regions at different locations within the environment. It is also possible, in some instances, to move or scan a detector described herein from location to location within the environment. Moving or scanning a detector in such a manner can increase the detection area of the method. In other cases, a two-dimensional detector such as a charge-coupled device (CCD) image sensor or camera is used to detect photoluminescence signals at a plurality of locations simultaneously.

Methods of imaging described herein, in some embodiments, also comprise correlating one or more detected photoluminescence signals with one or more temperatures or temperature ranges. The step of correlating a photoluminescence signal (or plurality of signals) with a temperature or temperature range (or plurality of temperatures or temperature ranges) can be carried out in any manner not inconsistent with the objectives of the present disclosure. In some cases, such correlating comprises determining a temporal profile of the temperature of the activation region. In some such embodiments, determining a temporal profile of the temperature of the activation region comprises equating the first (or, more generally, the nth) switching threshold temperature to the temperature of the environment at one or more time points, the time points corresponding to the initial detection or initial loss of the first (or, more generally, the nth) photoluminescence signal. Moreover, the foregoing determination can be made for a plurality of switching threshold temperatures of a plurality of ultrasound-switchable fluorophores disposed in the environment. In general, the foregoing determination can be made for up to n switching threshold temperatures, as described further hereinbelow. In this manner, a temporal profile of the temperature of the activation region can be determined with a precision based on the number of fluorophores used and the transition temperature bandwidths of the fluorophores. Such a method is described in further detail in the specific examples hereinbelow.

In other cases, correlating a photoluminescence signal (or plurality of signals) with a temperature or temperature range (or plurality of temperatures or temperature ranges) comprises determining a final temperature of the activation region, rather than or in addition to determining a temporal temperature profile of the activation region. For example, in some such embodiments, correlating a photoluminescence signal with a temperature or temperature range comprises determining a final temperature of the activation region following exposure of the activation region to the ultrasound beam. In some such instances, the final temperature is determined according to Equation (1) herein. Such a method is described in further detail in the specific examples hereinbelow.

In still other instances, correlating a photoluminescence signal (or plurality of signals) with a temperature or temperature range (or plurality of temperatures or temperature ranges) comprises determining a peak-to-peak modulated photoluminescence signal (or plurality of modulated signals) based on a modulated ultrasound beam. Moreover, such a method can further comprise normalizing the peak-to-peak modulated photoluminescence signal (or plurality of modulated signals) and plotting the normalized peak-to-peak modulated photoluminescence signal (or plurality of normalized modulated signals) as a function of time. Such a method is described in further detail in the specific examples hereinbelow.

Additionally, in some embodiments of a method described herein, the n temperatures or temperature ranges (e.g., the first, second, third, and fourth temperatures or temperature ranges) span a total temperature range in a continuous manner. For reference purposes herein, a total temperature range this is spanned in a "continuous" manner by n temperature or temperature ranges (such as four temperatures or temperature ranges) is spanned without a "gap" or without including a temperature that is not part of at least one of the n temperatures or temperature ranges (such as at least one of the first, second, third, and fourth temperatures or temperature ranges). In this manner, a method described herein can be used to detect any temperature within the total temperature range, as opposed to being "blind" to one or more temperatures within the total temperature range. Further, in some embodiments, one or more of the n temperatures or temperature ranges partially overlap with one another. For instance, in some cases, a first temperature range includes some but not all of a second temperature range. Such "overlapping" temperature ranges, in some instances, may permit improved sensitivity and/or precision of the method to the detection of one or more temperatures within the overlapping portions of adjacent temperature ranges.

It is to be understood that a method described herein can include any combination of steps described herein and use any combination of equipment and materials described herein not inconsistent with the objectives of the present disclosure.

Some embodiments described herein are further illustrated in the following non-limiting examples.

Example 1

Ultrasound Switchable Fluorophores

Ultrasound-switchable fluorophores suitable for use in some embodiments of methods described herein are prepared and used as follows.

Figure 1B:
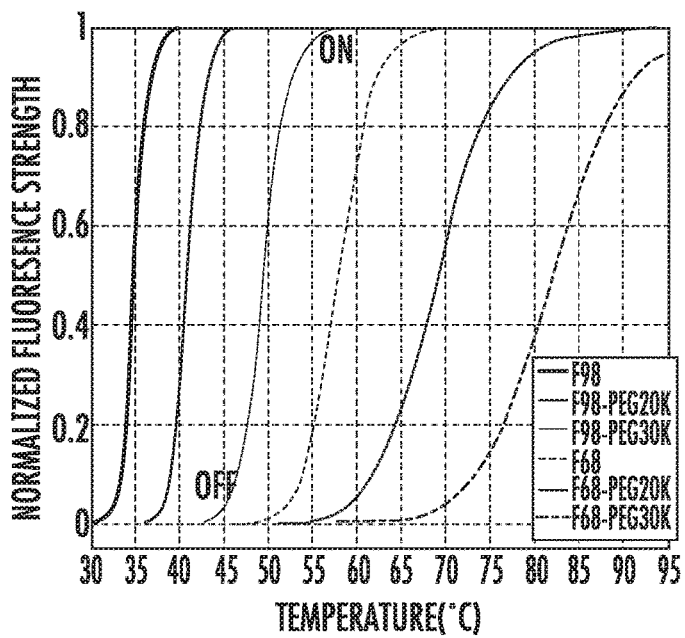
FIG. 1B illustrates a plot of temperature-dependent on and off states for a series of ultrasound-switchable fluorophores according to some embodiments described herein.
Figures 2A, 2B:
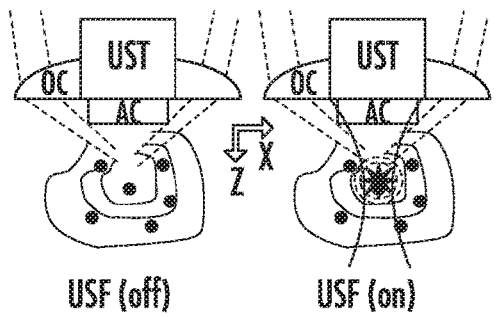
FIGS. 2A and 2B illustrate schematically steps of a method of forming an activation region according to one embodiment described herein.

As described above, the present disclosure relies generally on ultrasound fluorescence (USF) imaging. As understood by one of ordinary skill in the art and as described above, USF generally operates according to the following principles. When an environment-sensitive near infrared (NIR) fluorescent dye (such as $ADP(CA)_2$ or ICG) is encapsulated into a thermo-sensitive nanoparticle (formed from a thermo-sensitive polymer, such as biocompatible pluronic, see FIG. 1), the fluorescence emission exhibits a switch-like behavior as a function of the temperature (FIG. 1B). For instance, when the temperature (T) is below a threshold ($T_{th1}$, which can be defined as the temperature at which fluorescence intensity is 1% of the saturated fluorescence intensity), the nanoparticle exhibits hydrophilicity and provides a water-rich, polar, and non-viscous microenvironment in which the dye shows very low emission efficiency (the so-called "off" state). When T is above another threshold ($T>T_{th2}$), the nanoparticle exhibits hydrophobicity and provides a polymer-rich, non-polar, and viscous microenvironment in which the dye shows strong emission (the so-called "on" state). A transition band between the off and on states can be defined as the temperature between $T_{th2}$ and $T_{th1}$, and the bandwidth is defined as $T_{BW}=T_{th2}-T_{th1}$. Within the transition band, the fluorescence intensity increases quickly as temperature rises (see FIG. 1B). The first threshold ($T_{th1}$) can also be referred to as the lower critical solution temperature (LCST) of the thermo-sensitive nanoparticle. In USF imaging, the threshold $T_{th1}$ can be selected to be above the tissue (or other environment) background temperature ($T_{BG}$) to maintain an off state under normal conditions (FIG. 2A). When a focused ultrasound beam is applied to the tissue (or other environment), the tissue (or other environment) temperature at the focus will be increased above the threshold ($T>T_{th1}$) to switch on the fluorophores (FIG. 2B). The USF contrast agents outside the focus remain off if the ultrasound heating is sufficiently fast that the thermal diffusion can be ignored (so-called thermal confinement). A high-resolution USF image can be formed via scanning the ultrasound focus (i.e., point-by-point scanning).

Two-color USF imaging in deep tissue has been demonstrated using two different NIR fluorophores (ADP(CA)$_2$ and ICG). Three or four-color USF can be done using red and NIR fluorophores with different excitation (Ex) and emission (Em) peak wavelengths. For example, Color-1 can be select as Ex=630 nm and Em=635-655 nm; Color-2 can be select as Ex=671 nm and Em=680-710 nm; Color-3 can be Ex=730 nm and Em=740-770 nm; and Color-4 can be Ex=810 nm and Em>855 nm (see FIG. 3). Although spectral cross talk may be possible, several strategies can be adopted to minimize or unmix them, as described further hereinbelow. Thus, different contrast agents can be differentiated via their colors.

FIG. 1B shows that the temperature range between 45 and 95° C. can be covered by pluronic F98's and F68's PEGylated polymers. Specifically, NPs formed from F98, F98-PEG20k, F98-PEG30k, F68, F68-PEG20k, and F68-PEG30k can be used for both in vitro and in vivo HIFU ablation. The temperature range between 23 and 47° C. can be covered using several thermo-sensitive polymers: such as pluronic 127, F98, their PEGylated polymers, or others. Thus, any temperature or temperature range between 23 and 95° C. can be selected.

For optical properties, FIG. 1B clearly shows the excellent switching properties of the NIR fluorophore ADP(CA)$_2$ (aza-BODIPY cyanocinnamic acids: $\lambda_{ex}=683$; $\lambda_{em}=717$ nm). More information about this fluorophore can be found in Cheng et al., "Centimeter-deep tissue fluorescence microscopic imaging with high signal-to-noise ratio and picomole sensitivity," 2015, available at http://arxiv.org/abs/1510.02112. In addition, ICG (indocyanine green, $\lambda_{ex}=800$; $\lambda_{em}=830$ nm) based contrast agents (or ultrasound-switchable fluorophores) can also be used.

Figure 3A:
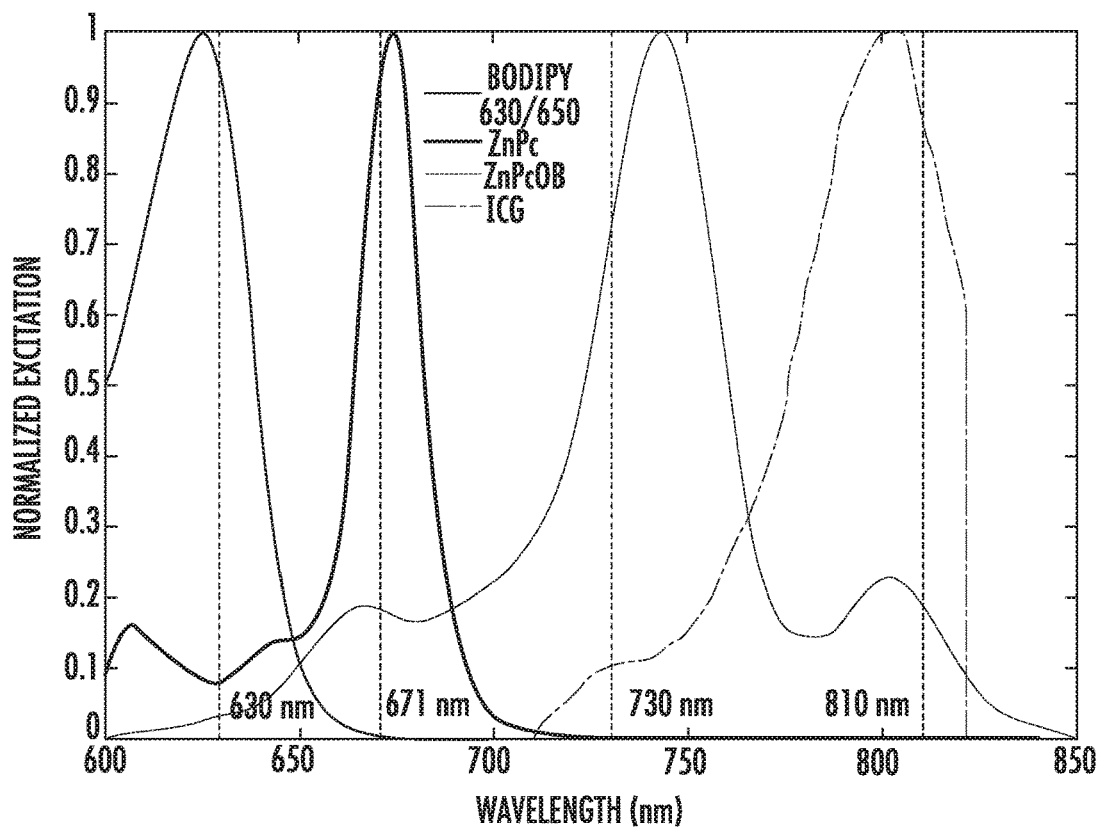
FIG. 3A illustrates a plot of excitation profiles for a series of ultrasound-switchable fluorophores according to some embodiments described herein.
Figure 3B:
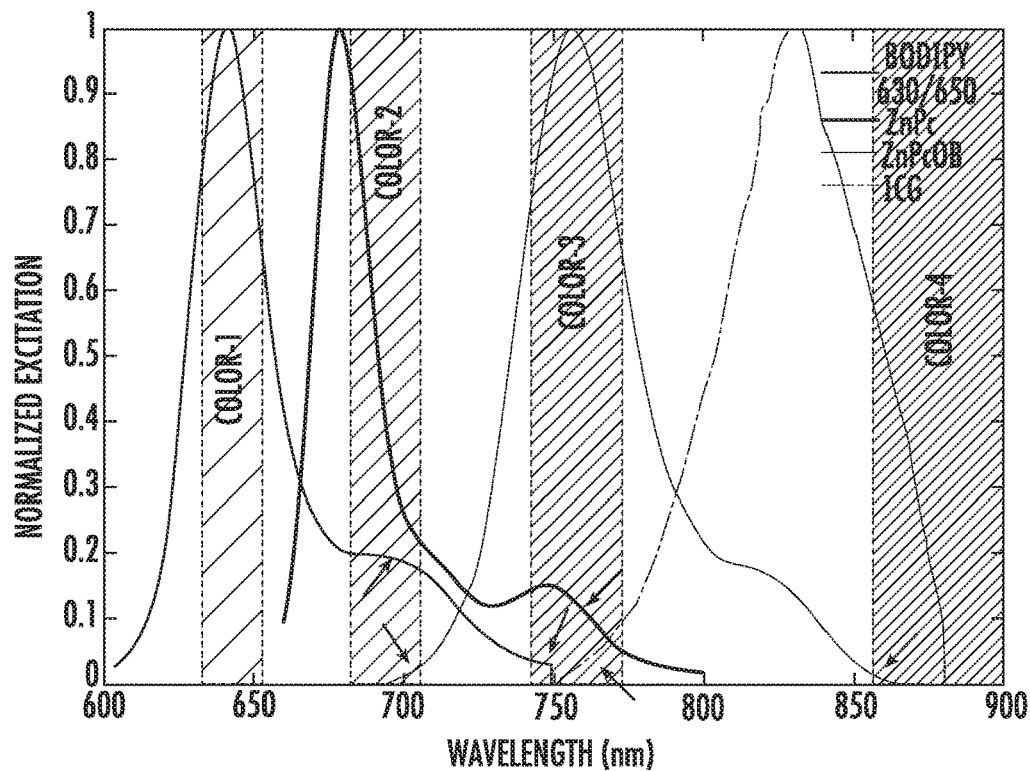
FIG. 3B illustrates a plot of emission profiles for a series of ultrasound-switchable fluorophores according to some embodiments described herein.

Moreover, an additional family of fluorophores may be especially suitable for some methods of thermometry described herein. These fluorophores are extremely environment-sensitive and have high values of $I_{ON}/I_{OFF}$. Specifically, the following set of fluorophores can be used: BODIPY 630/650, ZnPc (or ZnPcHF or ZnPcTTB), ZnP-cOB and ICG. All of these fluorophores are commercially available and their chemical structures can be found from Sigma. FIGS. 3A-B show their excitation and emission spectra, respectively. The excitation and emission spectra of these fluorophores are relatively narrow compared to other NIR fluorophores, which can reduce the spectral leakage. In addition, ZnPC dyes have excellent $I_{ON}/I_{OFF}$ (approximately 20-1450) and high $\tau_{ON}/\tau_{OFF}$ (approximately 4). For instance, the $I_{ON}/I_{OFF}$ of BODIPY 630/650 is >200. Further, these four fluorophores cover the range of red and NIR wavelengths. For instance, with reference to FIG. 3A, the central excitation wavelengths are 630, 671, 730 and 810 nm. The spectra of the emission detection (via optical filters) are shadowed in FIG. 3B, corresponding to Color-1 (635-655 nm), Color-2 (680-710 nm), Color-3 (740-770 nm), and Color-4 (>855 nm).

There are two common types of spectral cross talk. The first one is so-called "one laser excites multiple fluorophores" cross talk, due to the excitation spectrum overlap. For example, when the 630-nm laser is on, it may excite BODIPY, ZnPc and ZnPcOB (if all are present) (see FIG. 3A). This type of cross talk can be reduced or avoided via sequentially turning on each laser-camera pair, as described further hereinabove and hereinbelow. Briefly, the USF system can sequentially turn on each laser-camera pair via an accurate electronic triggering system. For example, when the 630-nm laser is on, only the Color-1 channel's camera is on. All other lasers and cameras are off. Thus, although the 630-nm laser can possibly excite all the three fluorophores (BODIPY, ZnPc and ZnPcOB), only the Color-1 channel's camera is triggered ON and will detect the emission mainly from BODIPY (via the Color-1 emission filter). In contrast, the Color-2 and Color-3 channel's cameras are triggered OFF and will not detect the emission from ZnPc and ZnPcOB (accidently excited by the 630-nm laser). Similarly, this rule is true for the other three laser-camera pairs.

The second type of cross talk is so-called "spectral bleed-through" cross talk, caused by the emission spectrum overlap. This cross talk can lead to emission leakage from one fluorophore channel to another (see the arrows in FIG. 3B). For example, when the 671-nm laser (the 2$^{nd}$ excitation source) is on and possibly excites BODIPY (very weakly), ZnPc (strongly) and ZnPcOB (weakly) (see FIG. 3A), a small part of the emission from BODIPY (belongs to Color-1) and from ZnPcOB (belongs to Color-3) may leak to the Color-2 channel's camera (it is the only camera that is turned on at this moment) because of the emission spectral overlap. This type of cross talk can be minimized via carefully selected emission filters and excitation light wavelengths. This type of cross talk may also be minimized or eliminated via a signal processing method, as described further herein. Also, if needed, any unavoided spectral leakage can be quantified prior to temperature measurement by using tissue phantoms and/or in vivo tissues, and then taken into account in further signal processing.

Using the foregoing fluorophores, high temperature sensitivity (approximately 6-12% per ° C., calculated from FIG. 1B) and a broad temperature sensitive range (approximately 45-95° C.) can be achieved.

Example 2

USF Thermometry Systems

USF thermometry systems suitable for use in some embodiments of methods described herein are provided as follows. The systems generally include optical, electronic and acoustic subsystems. The time to fire a laser (excitation) pulse and the time to trigger its corresponding camera is accurately controlled. Also, the optical and electronic systems are synchronized with a HIFU therapeutic system for simultaneous thermal treatment and temperature monitoring.

Figure 4A:
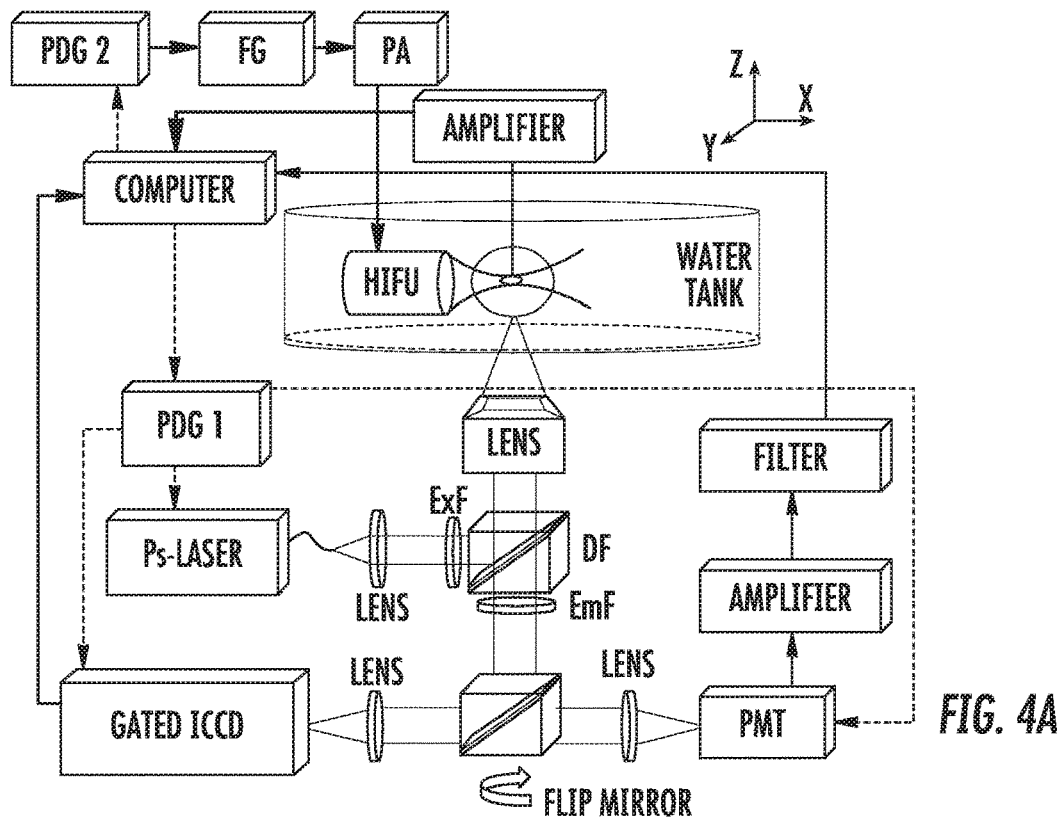
FIG. 4A illustrates schematically a USF system according to one embodiment described herein.

One so called time-domain USF imaging system includes (1) a gated intensified charge coupled device (ICCD) camera. The intensified nature of the ICCD is obtained from an optical amplifier whose gain can be electronically and fast gated with a response time of ps or ns, and a CCD camera with a response time of ms. The system can further include (2) a fast and gated photomultiplier tube (PMT, whose gain can be fast gated with a response time of ps or ns). The system diagram is shown in FIG. 4A. The components represent, inter alia, HIFU treatment system components, including a HIFU treatment transducer (2.5 MHz, Sonic Concepts, H-108), a RF power amplifier (PA), and a function generator (FG). A pico-second (ps) pulsed laser is used as the excitation light source. Other components represent the ICCD and PMT based optical detection systems. A pulser-delay generator (PDG) with multi-channels is used to control the time sequence of the entire system. A computer is adopted to acquire the data. To measure the HIFU-induced temperature increase inside the tissue sample, a small thermocouple (with a junction size of 25 µm to avoid possible viscous heating) is attached inside a micro-tube that is filled with USF contrast agent solution. The micro-tube is embedded inside the tissue sample.

Figure 4B:
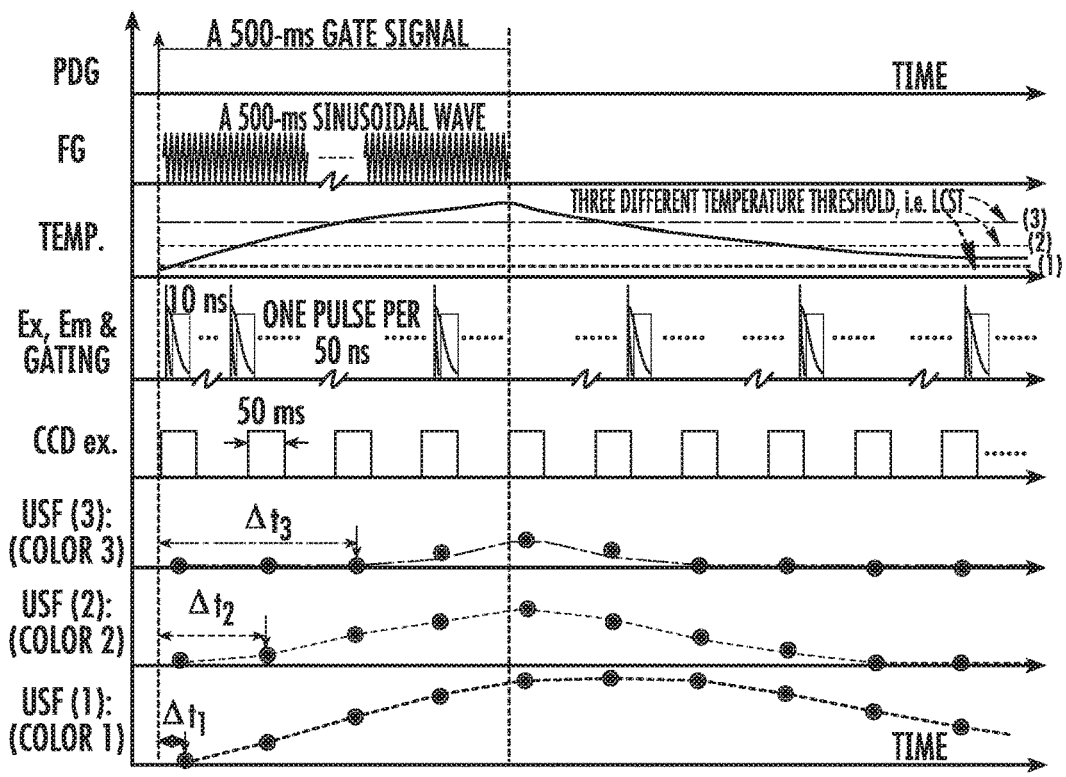
FIG. 4B illustrates schematically steps of one embodiment of a method of thermometry using the system of FIG. 4A.

FIG. 4B schematically shows the principle of temperature measurement by plotting the time sequence of events of the entire system. Briefly, as one example, a 500-ms long and 2.5 MHz sinusoidal wave is generated from the FG via a gate signal from the PDG (the $1^{st}$ and $2^{nd}$ row in FIG. 4B). This sinusoidal wave is amplified by the PA and used to drive the HIFU transducer. Thus, the tissue temperature at the HIFU focal area will increase during the 500-ms exposure and then decrease after the exposure (see the $3^{rd}$ row). The three dotted horizontal lines are assumed to be the temperature thresholds (i.e., $T_{th1}$, $T_{th2}$, $T_{th3}$) of three different USF temperature contrast agents. The laser is running at 20 MHz to send many pico-second pulses of excitation light into the tissue (see the narrow pulses in the $4^{th}$ row) (i.e., firing a light pulse every 50 ns). The emission fluorescence pulse has a relatively long tail (see the decay curve in the $4^{th}$ row). The gain of the intensifier of the ICCD is turned on for 10 ns (via an electronic gate pulse) to integrate the emission photons in each emission pulse (see the squares in the $4^{th}$ row). This number of 10 ns is variable depending on how long the emission pulse is. To reduce the leakage from the excitation light, appropriately delaying the gate relative to the excitation pulse is possible (see the squares in the $4^{th}$ row). It should be noted that the time scale (ns) in the $4^{th}$ line is much shorter than others (ms).

For purposes of illustration, the following are assumed: (1) the exposure time of the CCD is 50 ms per frame (see the squares in the $5^{th}$ row) and (2) a short period of time of 75 ms is followed for camera readout and hibernation. Thus, within each 50-ms CCD exposure, there are 1 million emission pulses (each pulse is gated with a length of 10 ns) that are integrated on the CCD (50 ms/50 ns=1 million), which then form a frame image. This is so-called "temporal integration." As discussed above, the USF signal on each frame image can be spatially integrated (or summed), which is so-called "spatial integration," because they are USF photons and come from the HIFU focal volume. Thus, a number representing the USF signal strength can be found for each 50-ms CCD exposure.

The last three rows (i.e. the $6^{th}$, $7^{th}$ and $8^{th}$ rows) in FIG. 4B represent the USF signals as a function of time (with a time step size of 50 ms) from the three different temperature thresholds (see the $3^{rd}$ row). Clearly, they have quite different features. For example, the contrast agent/fluorophore with a low temperature threshold (color 1, the $8^{th}$ row) shows USF signal earlier than those with a high temperature threshold (color 2 or 3, the $7^{th}$ and $6^{th}$ rows), which means $\Delta t_1 < \Delta t_2 < \Delta t_3$. Using these features, tissue temperature can be reconstructed, as described further herein. The time (or temporal) resolution of temperature measurement is determined by the time period between two frames (125 ms=50+75 ms in this example).

For the PMT-based system, the principle is same, but the laser and the gating of PMT are running at a much lower frequency (<1 MHz), which is limited by the PMT gating repetition rate. To achieve an acceptable SNR, the energy of each laser pulse can be significantly increased. The spatial integration can also be used for the PMT system because the adopted PMT has a photon sensitive area with a diameter of 1 cm. One benefit of using a PMT-based system is that it has a much higher time (or temporal) resolution because (unlike a CCD camera) a PMT is a real time detector and does not need to wait for readout and hibernation. Thus, the theoretical temporal resolution of temperature measurement depends on the time period between two adjacent gates of PMT or between two adjacent laser pulses (usually they are equal). For example, the theoretical temporal resolution can reach 1 µs, if the repetition rate of PMT gating is 1 MHz. In practice, increasing temporal resolution will decrease SNR. It was determined that our best temporal resolution is about 20 ms, which gives 20,000 laser pulses to temporally accumulated USF signal for one temperature point (if the PMT repetition rate is 1 MHz). For monitoring HIFU treatment, the temporal resolution may be further reduced to 100-500 ms if the SNR is an issue.

Figure 5A:
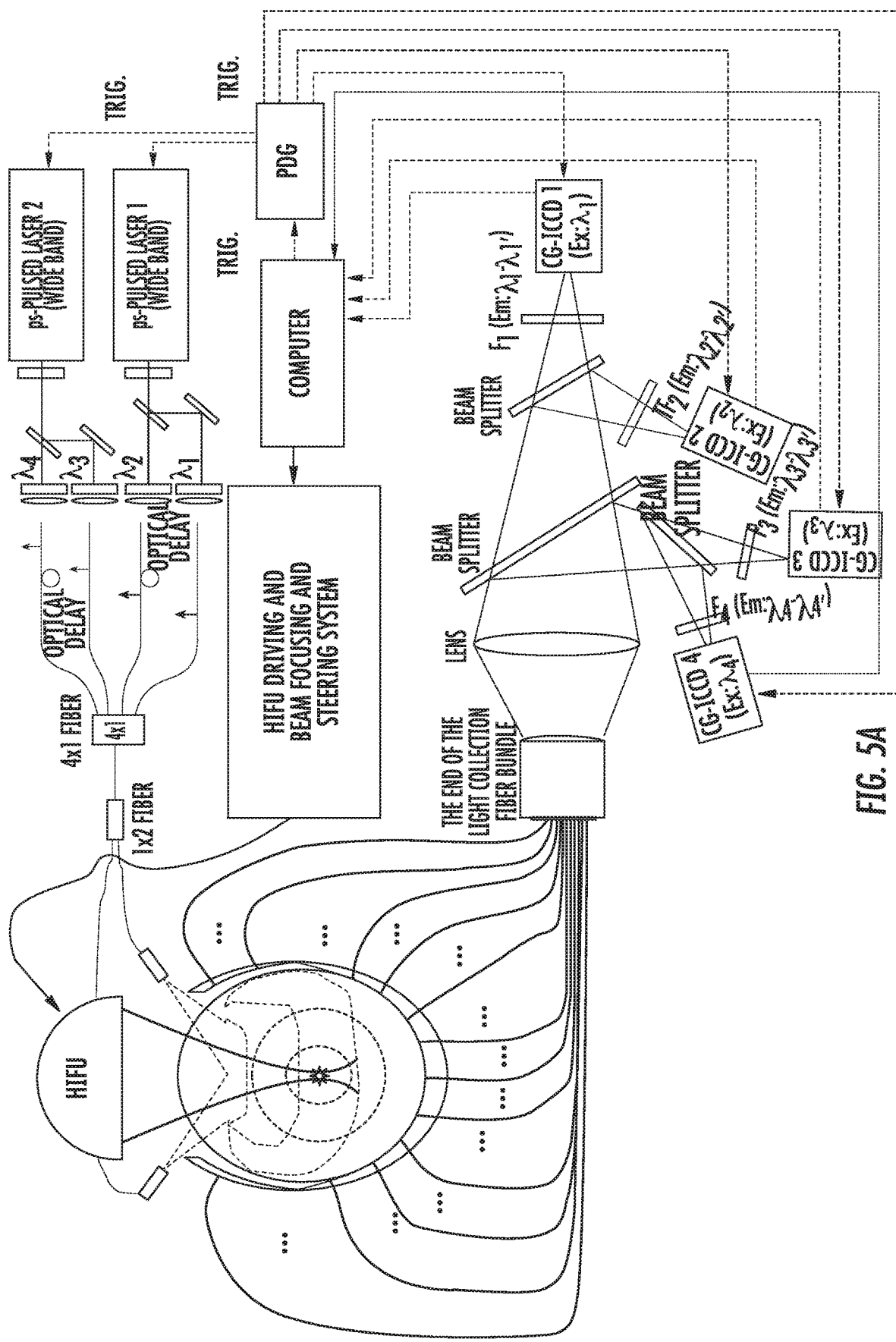
FIG. 5A illustrates schematically a USF system according to one embodiment described herein.

Another USF system is illustrated in FIG. 5. As illustrated in FIG. 5, this system is specifically designed for use with small animals (such as a mouse or rat). Specifically, the system uses a large number of optical fiber bundles to surround the animal body for efficiently collecting as many USF photons as possible. However, for other applications (such as human prostate treatment), the configuration of fibers can be changed to fit that case. Compared with the system of FIG. 4, the system of FIG. 5 includes the following notable components: (1) an animal holding system; (2) a four-color excitation light system; (3) a four-color emission detection system; and (4) a multi-fiber USF photon collection system.

To reduce the cost of this system while still maintaining excellent performance (such as four colors and good signal strength), it is possible to use two wideband ps-pulsed lasers and four gated-ICCD cameras with a repetition rate of 1 MHz. It is even possible to use only one laser and fewer ICCD cameras to further reduce the cost.

Figure 5B:
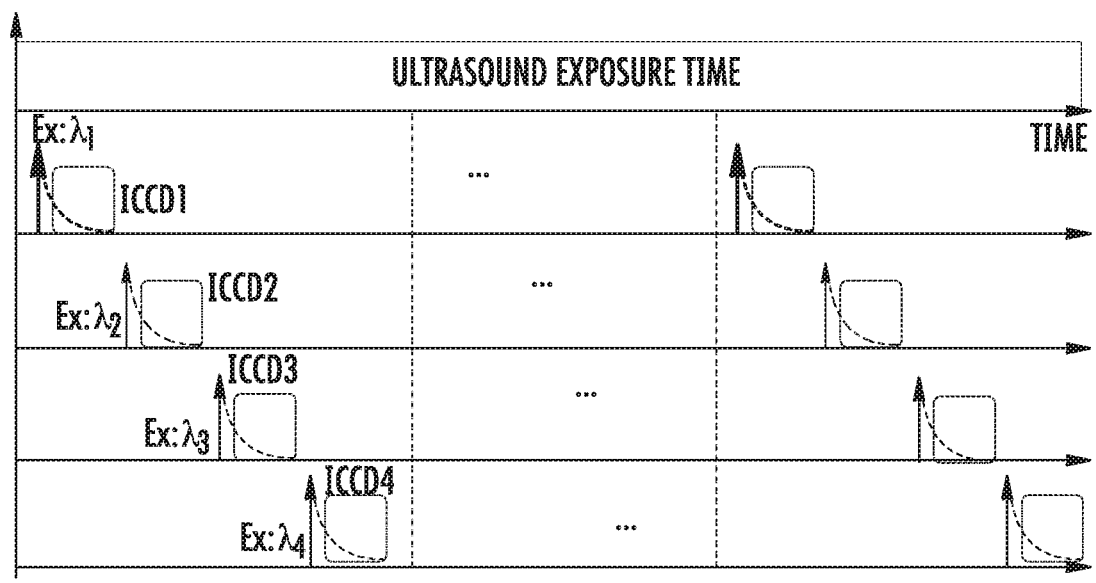
FIG. 5B illustrates schematically steps of one embodiment of a method of thermometry using the system of FIG. 5A.

In the embodiment of FIG. 5, the $1^{st}$ laser provides the excitation light pulses for color-1 and color-2. The $2^{nd}$ laser provides the excitation light pulses for color-3 and color-4. A 200-ns time delay between the two lasers can be accurately generated via the PDG (200 ns can be adjusted). A 100-ns time delay between color-1 and color-2 pulses (and between color-3 and color-4 pules) can be generated using an optical fiber with a length of ~20.4 meters and a core size of 62.5 µm. Thus, it can be assumed that the four-colored excitation pulses arrive at the tissue at 0, 100, 200 and 300 ns, respectively. At the same time, the four ICCD cameras are sequentially triggered on to appropriately receive their desired emission photons. Once this cycle is done, the acquisitions of the four-colored USF photons are done for one time. It takes 400 ns. This procedure can be repeated when the next group of four-colored photons comes. The arriving time of the $2^{nd}$ group depends on the repetition rate of the laser and cameras, which is 500 ns for 2 MHz or 1000 ns for 1 MHz repetition rate. Limited by the camera's repetition rate, 1 MHz can be selected in this instance. The specific time sequence is shown in FIG. 5B. Not intending to be bound by theory, it is believed that this system can achieve high temperature sensitivity due to (1) a large number of photon collection fibers (which can be considered equivalent to spatial integration; if 16 optical fibers are used for collection, SNR could increase about four times); (2) temporally blocking laser leakage via the time gating method (suppressing noise); and/or (3) a large number of gated emission pulses that are temporally accumulated by the ICCD (which can be considered equivalent to temporal integration). Moreover, in this system, SNR or sensitivity for the four fluorophores can be balanced by adjusting the laser intensity and the gain of the cameras.

As an alternative to the system of FIG. 5, it is possible to use more lasers and ICCDs, or to use one wideband ps-pulsed laser (400-2000 nm) by splitting the beam into four beams via three high quality dichroic filters. Four narrowband excitation filters can be used to select the four required wavelengths. Optical fibers with four different lengths can be used to delay certain time of the light pulses for simultaneous four-color imaging.

Example 3

Methods of Measuring Temperature

The temperature of an environment is measured according to some embodiments described herein as follows. As described above, one or more USF photoluminescence signals can be correlated to one or more temperatures or temperature ranges. Several specific methods of correlation are described in this Example.

In the first specific method described in this Example, tissue temperature is estimated or measured in real time by determining a temporal temperature profile of the activation region. This determination is made as follows. During the HIFU heating period, it is possible to "just" or initially detect the USF signal from one contrast agent (or color) when a small volume ($\delta V$) around the central region of the HIFU focus is "just" or initially occurring and then increasing. In this region, the average temperature ($T_M$) is slightly above the temperature threshold of that contrast agent ($T_{th}$). At this moment, $T_M$ is the highest temperature compared with the temperature in the surrounding area. During the cooling period (HIFU is off), the reverse occurs. Namely, there is a time point at which the USF signal is initially lost (or at which it is "just" not possible to detect the USF signal) for the same contrast agent (or color). This occurs when the $\delta V$ just vanishes. To estimate the average temperature ($T_M$) in the small volume ($\delta V$) via USF colors, it can be defined that $T_M \approx T_{th}$ at the time (t) when the USF signal is just or initially observed. Similarly, it is defined that $T_M \approx T_{th}$ when the USF signal from the same contrast agent (or color) vanishes or is initially lost at another time during the cooling period. Thus, the tissue average temperature ($T_M$) in the small volume of $\delta V$ at the center of the HIFU focus can be very simply estimated as a function of time.

For example, during the heating period, the USF signal from the color-1 contrast agent (with a temperature threshold of $T_{th1}$) just occurs at $t=t_1$ (then increases). Based on the above definition, $T_M(t_1) \approx T_{th1}$. The similar conclusion can be achieved for other contrast agents (or colors): $T_M(t_2) \approx T_{th2}$, $T_M(t_3) \approx T_{th3}$ and $T_M(t_4) \approx T_{th4}$. During the cooling period (HIFU is off), the sequence becomes inverse, which means $T_M(t_5) \approx T_{th4}$, $T_M(t_6) \approx T_{th3}$, $T_M(t_7) \approx T_{th2}$ and $T_M(t_8) \approx T_{th1}$. This means that the color occurring earlier will vanish later. Thus, the real time tissue temperature variation can be estimated based on the times that the USF colors occur and vanish ($t_1$-$t_8$). This method is very simple and fast. It can provide a measurement of the dynamic variation of temperature within the environment. More specifically, it provides the time variation of an approximated average temperature ($T_M$) in a small volume of $\delta V$ around the central region of the HIFU focus. The temperature resolution of this approach depends on the transition bandwidth of the relevant contrast agent (which may be about 10° C.).

In the second specific method described in this Example, previous heating speeds are used to estimate the final temperature at the end of the HIFU exposure. If the entire HIFU exposure time is $t_p$, the temperature at $t_p$ (denoted as $T(t_p)$) can be estimated as follows. It is first assumed that the last color that can be detected at $t_p$ is the $(i+1)^{th}$ color (i can be any number from 1 to 3), this means that $T(t_p) > T_{th(i+1)}$. Thus, $T(t_p)$ can be estimated via an approximation (identified as Equation (1)):

$$T(t_p) \approx V_{i+1}*(t_p-t_{i+1})+T_{th(i+1)} \qquad \text{Equation (1)},$$

where $t_{i+1}$ is the time when the $(i+1)^{th}$ color is just detected and $V_{i+1}$ is the heating speed when the temperature is above $T_{th(i+1)}$. In this equation, all parameters are known except $V_{i+1}$. Further, $V_{i+1}$ can be estimated from previous heating speeds ($V_i \ldots V_1$). Specially, the previous heating speeds can be estimated as $V_i=(T_{th(i+1)}-T_{th(i)})/(t_{i+1}-t_i)$. Accordingly, $V_{i+1}$ is estimated based on different situations: (a) $V_{i+1} \approx 3(V_i-V_{i-1})+V_{i-2}$ if three previous heating speeds ($V_i$, $V_{i-1}$ and $V_{i-2}$) are available, which is derived based on the $2^{nd}$ order approximation of $(V_{i+1}-V_i) \approx (V_i-V_{i-1})+[(V_i-V_{i-1})-(V_{i-1}-V_{i-2})]$; (b) $V_{u+1} \approx 2V_i-V_{i-1}$ if only two previous heating speeds are available ($V_i$ and $V_{i-1}$), which is derived based on the $1^{st}$ assumption of $(V_{i+1}-V_i) \approx (V_i-V_{i-1})$; (c) $V_{i+1} \approx V_i$ if only one previous heating speed ($V_i$) is available, which is the $0^{th}$ order approximation.

Combining the above two specific methods, it is possible achieve a total of nine data points if four colors are adopted ($t_1$-$t_4$, $t_p$, $t_5$-$t_8$).

In the third specific method described in this Example, modulation of the HIFU exposure is used. As one example, HIFU is turned on for 0.02 s and then off for 0.08 s. This on-and-off exposure pattern lasts for a total of 3.02 s (i.e., $t_p$=3.02 s). This continuous modulation of HIFU exposure is an extreme case to demonstrate this method. In practice, only a few cycles (approximately 3-4) (added on the regular HIFU exposure) are enough to estimate the heating speed. Thus, the modulation does not significantly affect the original HIFU exposure pattern. The following particular example illustrates the operation of the three specific methods identified above.

Figure 6A:
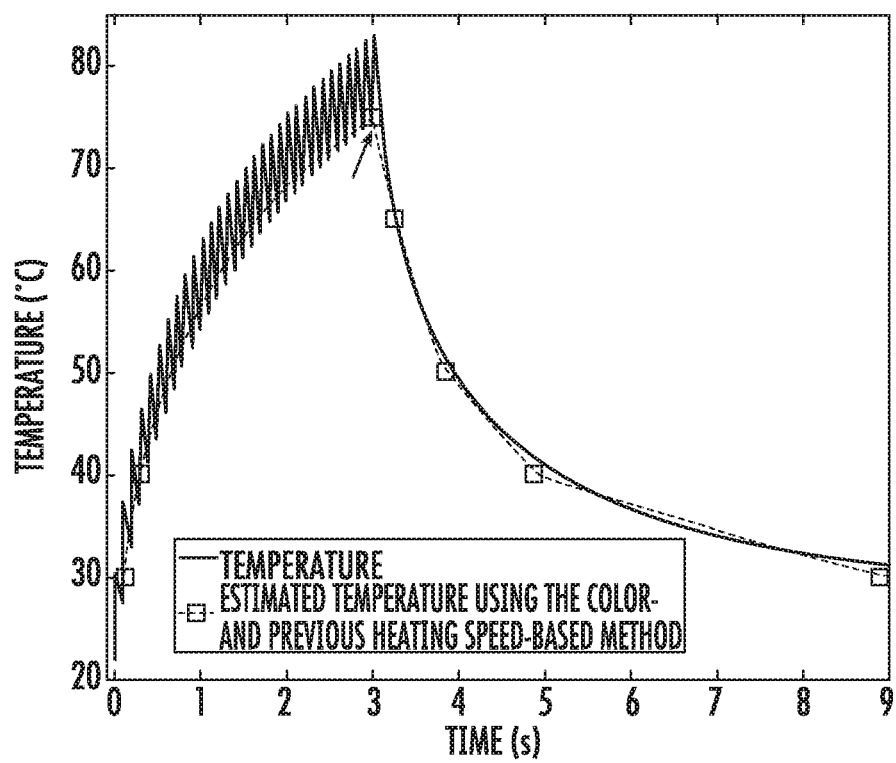
FIGS. 6A-6E illustrate schematically steps of a method of measuring temperature according to one embodiment described herein.
Figure 6B:
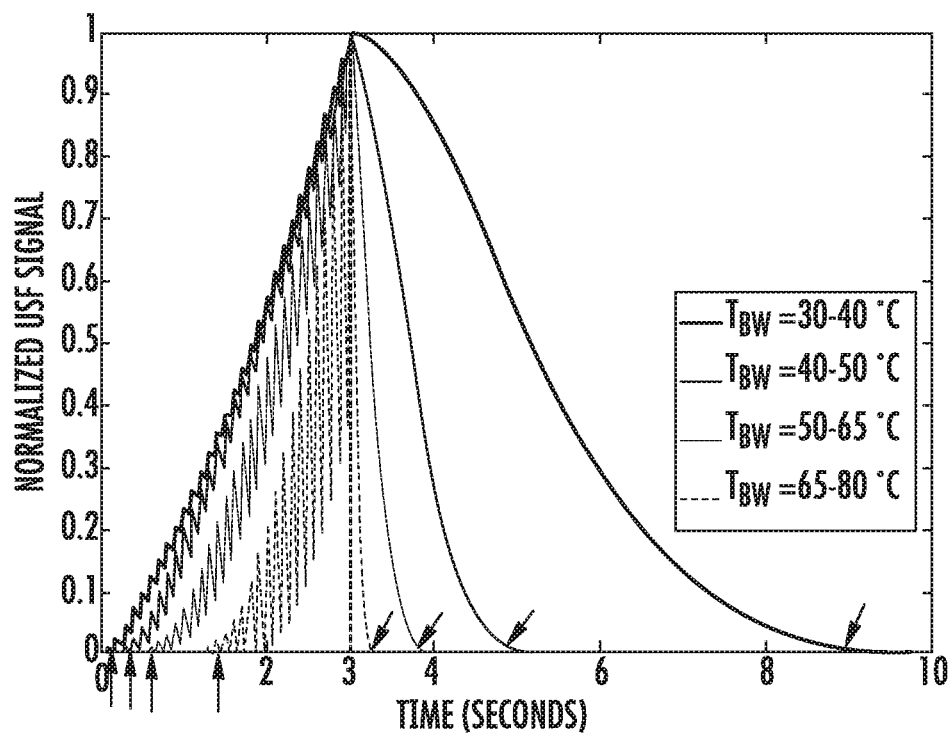

FIG. 6A shows the HIFU-induced temperature modulation. The corresponding USF signals from four contrast agents with four different thresholds ($T_{th1}$=30, $T_{th2}$=40, $T_{th3}$=50, $T_{th4}$=65° C.) are shown in FIG. 6B. The eight arrows indicate the time points when the four USF signals occur ($t_1$-$t_4$: 0.12, 0.32, 0.62 and 1.42 s) and vanish ($t_5$-$t_8$: 3.25, 3.84, 4.89 and 8.9 s). FIG. 6A shows the estimated temperature using the first two methods (see the squares). Specifically, using the color-based method (the first specific method described in this Example), the temperature at $t_1$-$t_8$ is approximated as 30, 40, 50, 65, 65, 50, 40 and 30° C., respectively. Using the previous-heating-speed-based method (the second specific method described in this Example), the temperature at $t_p$=3.02 s (between $t_4$ and $t_5$) is estimated as 75° C., which is explained below. Thus, in this example, three previous heating speeds are known and can be calculated as: $V_1$=(40−30)/(0.32−0.12)=50° C./s; $V_2$= (50−40)/(0.62−0.32)=33.33° C./s; $V_3$=(65−50)/(1.42−0.62)= 18.75° C./s. Thus, $V_4 \approx 3(V_3-V_2)+V_1$=6.25° C./S. Accordingly, $T(t_p=3.02\ s) \approx V_{i+1}*(t_p-t_{i+1})+T_{th(i+1)}$=6.25* (3.02−1.42)+65=75° C. A total of nine temperature values are estimated and displayed in FIG. 6A as a rough estimation of the temperature dynamic variation (the arrow indicates $T(t_p)$, estimated using a different method).

Figure 6C:
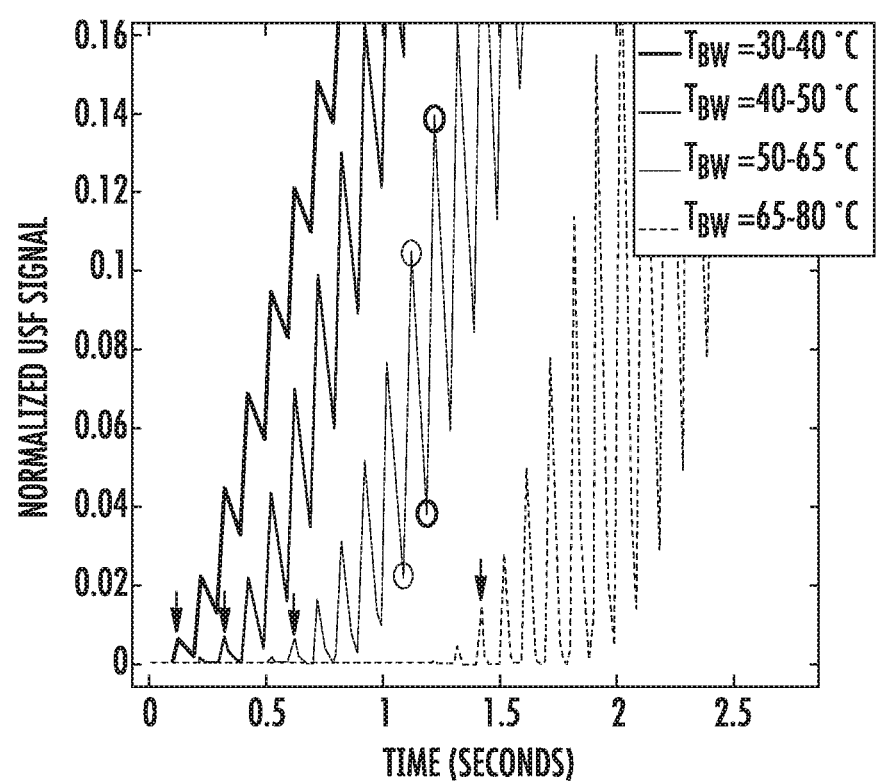
Figure 6D:
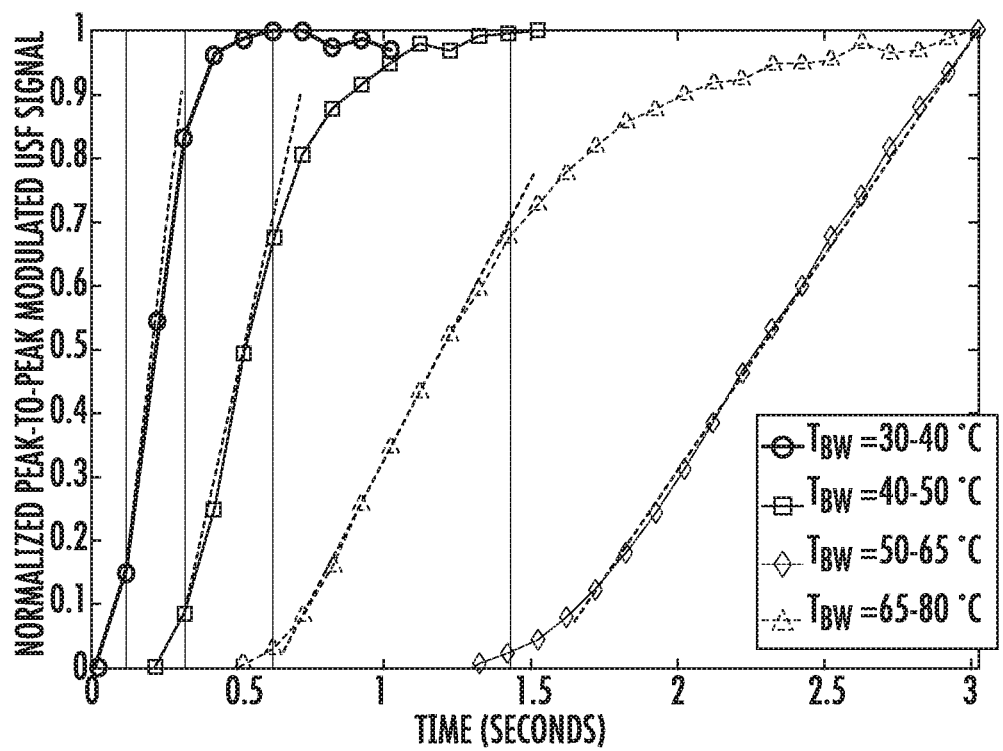
Figure 6E:
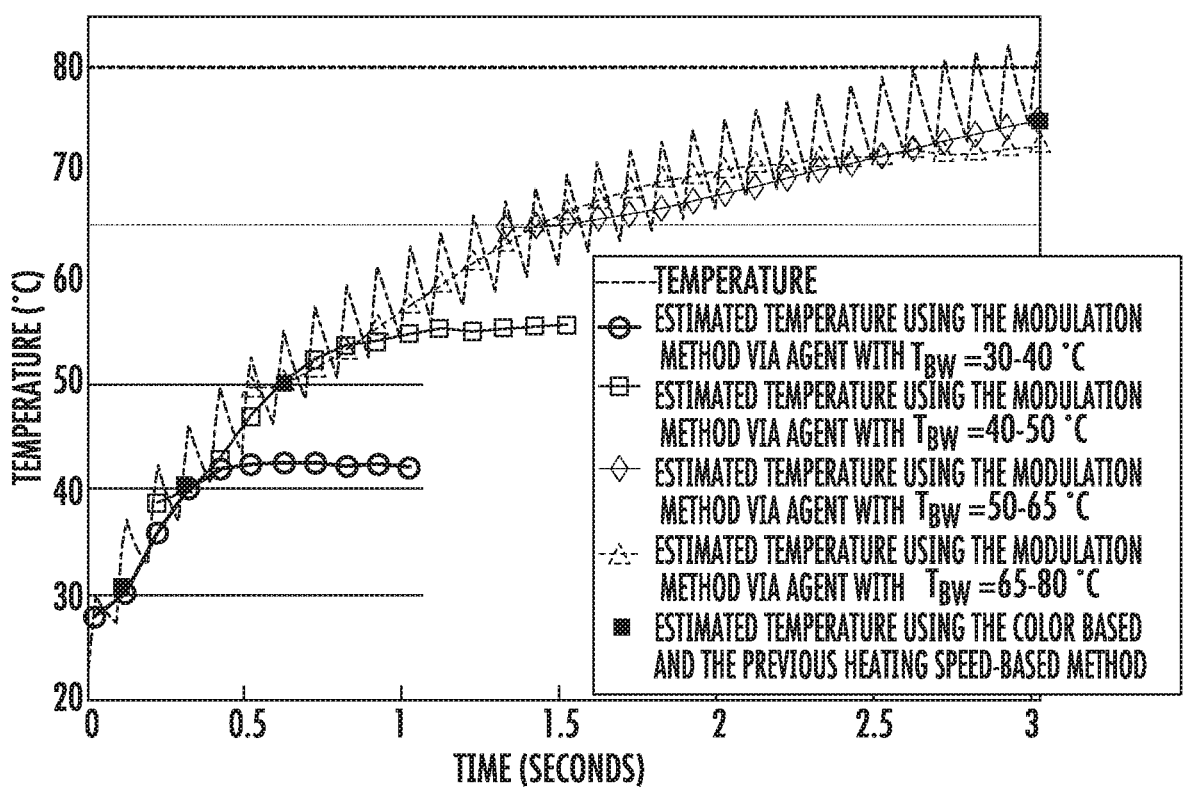

To demonstrate the modulation-based method, FIG. 6C shows the zoom-in data of the USF modulated signal. The peak-to-peak modulated USF signal ($U_{pp}$) is calculated for each time point (see the four circled peak points). The top darker colored point minus the bottom darker colored point is used to represent the peak-to-peak USF signal. Similar procedures are processed for all other points. Thus, the normalized peak-to-peak USF signals as a function of time are plotted in FIG. 6D for the four different agents. The four curves have a switch-like shape, which is similar to the USF switching properties. The main slopes of the four curves are gradually decreasing, which reflects that the heating speeds are reducing due to the thermal diffusion. The four vertical lines represent the times when the new colored USF just occurs and the corresponding temperatures are 30, 40, 50 and 65° C. Thus, these normalized peak-to-peak USF signals can be mapped into or correlated with temperature. FIG. 6E displays the results. When mapping the $4^{th}$ line (the rightmost line in FIG. 6D), the final temperature ($T(t_p)$=75° C.) was adopted, based on the estimate of the previous heating speeds method above. The temperature dynamic variation is estimated by the four fractions of the four curves. This modulation-based method is equivalent to adding more data points in each fraction. Thus, the temperature resolution becomes much higher, which depends on the temporal resolution of the system and the heating speeds. The above example shows different temperature resolutions of <5, <3, <2 and <1° C. for the four lines from left to right, respectively.

Generally, it is true that the size of the thermal field is much larger than the size of the HIFU acoustic field because thermal diffusion occurs. The previously estimated temperature $T_m(t)$ in FIG. 6A or FIG. 6E represents the temperature in the central region of the HIFU acoustic field. To measure the temperature lateral or axial distribution, the HIFU transducer is scanned either laterally or axially. The step size depends on the required spatial resolution. The step size is generally similar to or larger than the lateral or axial acoustic focal size. This scanning starts immediately after the regular HIFU exposure and is finished quickly to avoid significant background temperature reduction. At each off-center location, a few narrow HIFU pulses (tens of milliseconds) are fired to quickly modulate the local temperature. The modulation pulse intensity and pulse width are the same as before. Thus, the measured peak-to-peak value of the new modulated USF signal ($U_{pp}$) at the current location can be compared with those previously measured $U_{pp}$ (i.e., normalized by the same maximum $U_{pp}$, see FIG. 6D). Accordingly, based on the same principle as the modulation method (i.e., if the normalized $U_{pp}(t)$ is known, $T_M$ is known), the background temperature at each location can be estimated. When the HIFU focus is gradually scanned away from the center, the normalized $U_{pp}$ gradually decreases because the background temperature decreases.

Using the above methods, the temporal resolution can achieve 20-50 milliseconds, the spatial resolution can reach the acoustic focal size of the HIFU transducer, and the temperature resolution can be as low as <1° C. or as large as 10° C., depending on the method adopted.

Example 4

Ultrasound Switchable Fluorophores and Methods of Measuring Temperature

Ultrasound switchable fluorophores suitable for use in methods described herein, such as methods of measuring the temperature of an environment, were prepared and evaluated as follows.

First, several temperature-switchable near-infrared (NIR) fluorophores (also denoted as "NIR fluorescent nano-capsules") were synthesized. The fluorophores were based on two series of NIR fluorescent dyes (ADP and ZnPc) and four Pluronic polymers (F127, F98, F68 and F38). Such dyes are described, for instance, in Amin et al., "Syntheses, Electrochemistry, and Photodynamics of Ferrocene Azadipyrromethane Donor-Acceptor Dyads and Triads," *J. Phys. Chem. A* 2011, 115, 9810-9819; Bandi et al., "Excitation-Wavelength-Dependent, Ultrafast Photoinduced Electron Transfer in Bisferrocene/BF$_2$—Chelated-Azadipyrromethene/Fullerene Tetrads," *Chem. Eur. J.* 2013, 19, 7221-7230; and Collini et al., "Directly Attached Bisdonor-BF$_2$ Chelated Azadipyrromethene-Fullerene Tetrads for Promoting Ground and Excited State Charge Transfer," *Chem. Eur. J.* 2017, 23, 4450-4461. As described further below, the fluorescence intensity and lifetime of these "nano-capsules" showed switch-like behavior as a function of temperature.

For reference purposes for the ZnPc series of dyes, ZnPc is Zinc phthalocyanine; ZnHFPc is Zinc 1,2,3,4,8,9,10,11, 15,16,17,18,22,23,24,25-hexadecafluoro-29H,31H-phthalocyanine; ZnttbPc is Zinc 2,9,16,23-tetra-tert-butyl-29H, 31H-phthalocyanine; ZnttbNPc is Zinc 2,11,20,29-tetra-tert-butyl-2,3-naphthalocyanine; ZnooPc is Zinc 2,3,9,10,16,17, 23,24-octakis(octyloxy)-29H,31H-phthalocyanine; and ZnobPc is Zinc 1,4,8,11,15,18,22,25-octabutoxy-29H,31H-phthalocyanine.

Further, for reference purposes for the ADP series of dyes, ADP is BF$_2$-chelated azadipyrromethane (also called "aza-BODIPY"); ADP OH Top is BF$_2$-chelated 4-{2-[3-(4-hydroxyphenyl)-5-phenyl-1H-pyrrol-2ylimino]-5-phenyl-2H-pyrrol-3-yl}phenol; ADP OH Bottom is BF$_2$-chelated [5-(4-hydroxyphenyl)-3-phenyl-1H-pyrrol-2-yl]-[5-(4-hydroxyphenyl)-3-phenylpyrrol-2-ylidene] amine; and ADPCA is as described above.

In general, to prepare the fluorophores, various Pluronic polymers (e.g., F127, F98, F68, or F38) are individually dissolved in 100 mL DI water (pH=8.5) to make various Pluronic solutions. Further, such polymer solutions were prepared with different concentrations of polymer (w/v: 5% or 1%). Then, 0.4 mg ADP series dye (including ADP, ADP OH Bottom, ADP OH Top, or ADPCA) or ZnPc series dye (including ZnPc, ZnttbPc, ZnHFPc, ZnobPc, ZnooPc, or ZnttbNPc), together with 4.8 mg TBAI, is dissolved in 6 mL chloroform. This dye solution is then added dropwise to 15 mL of one of the Pluronic solutions, while stirring the Pluronic solution at 600 rpm. The mixture is next placed under sonication (40 Watts) for 4 minutes to form the nano-capsules. The mixture is then stirred at 475 rpm overnight in a chemical fume hood until the chloroform evaporates completely. To obtain a purified sample of the dye-encapsulating polymer capsules, the "as prepared" solution is either filtered using a membrane with a 450-μm pore size or centrifuged using a centrifuge filter with a molecular weight cut-off (MWCO) of 10,000.

Nano-capsules described in this Example were selected based on their thermo-sensitive properties of fluorescence, from three perspectives: 1) those with a high fluorescence intensity ratio between on and off states ($I_{On}/I_{Off}$); 2) those with a high fluorescence lifetime ratio between on and off states ($\tau_{On}/\tau_{Off}$); and 3) those with different or varying temperature thresholds for switching on the fluorophores.

Figure 7:
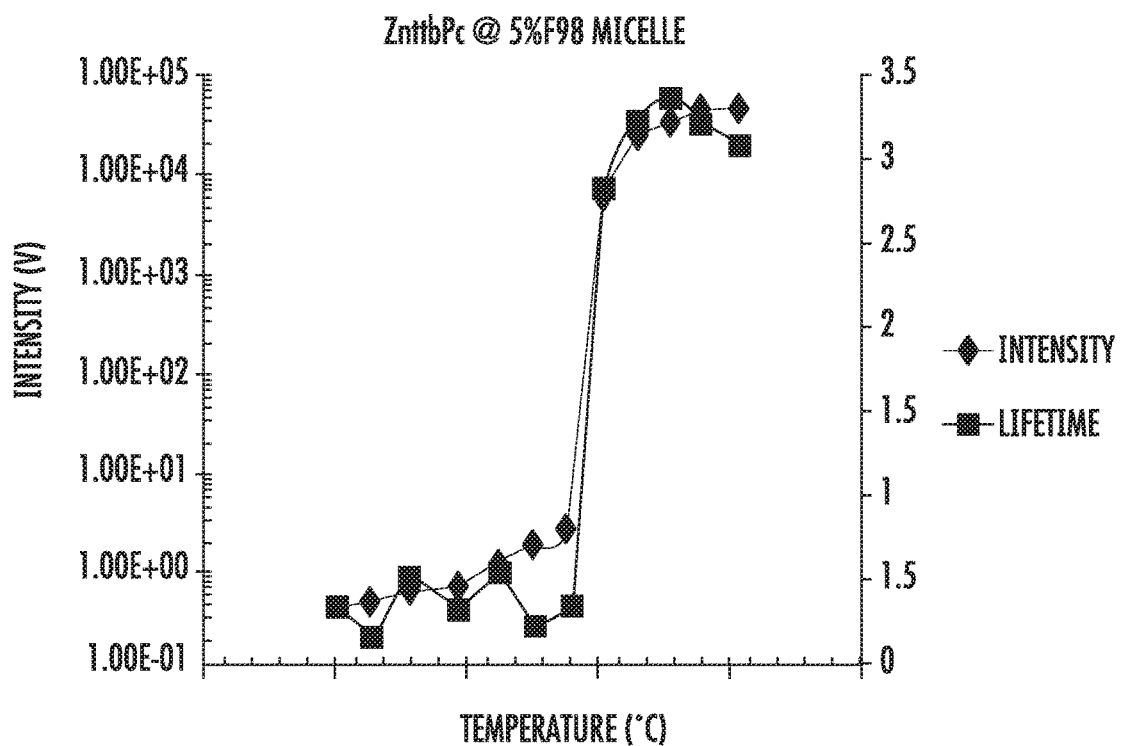
FIG. 7 illustrates plots of temperature-dependent on and off states for a series of ultrasound-switchable fluorophores according to some embodiments described herein.

FIG. 7 illustrates the fluorescence intensity and lifetime of ZnttbPc encapsulated in 5% pluronic F98 nano-capsules. As illustrated in FIG. 7, this fluorophore provided excellent $I_{On}/I_{Off}$ and $\tau_{On}/\tau_{Off}$ ratios. Additionally, the $T_{th}$ for this fluorophore was about 28° C.

Figure 8:
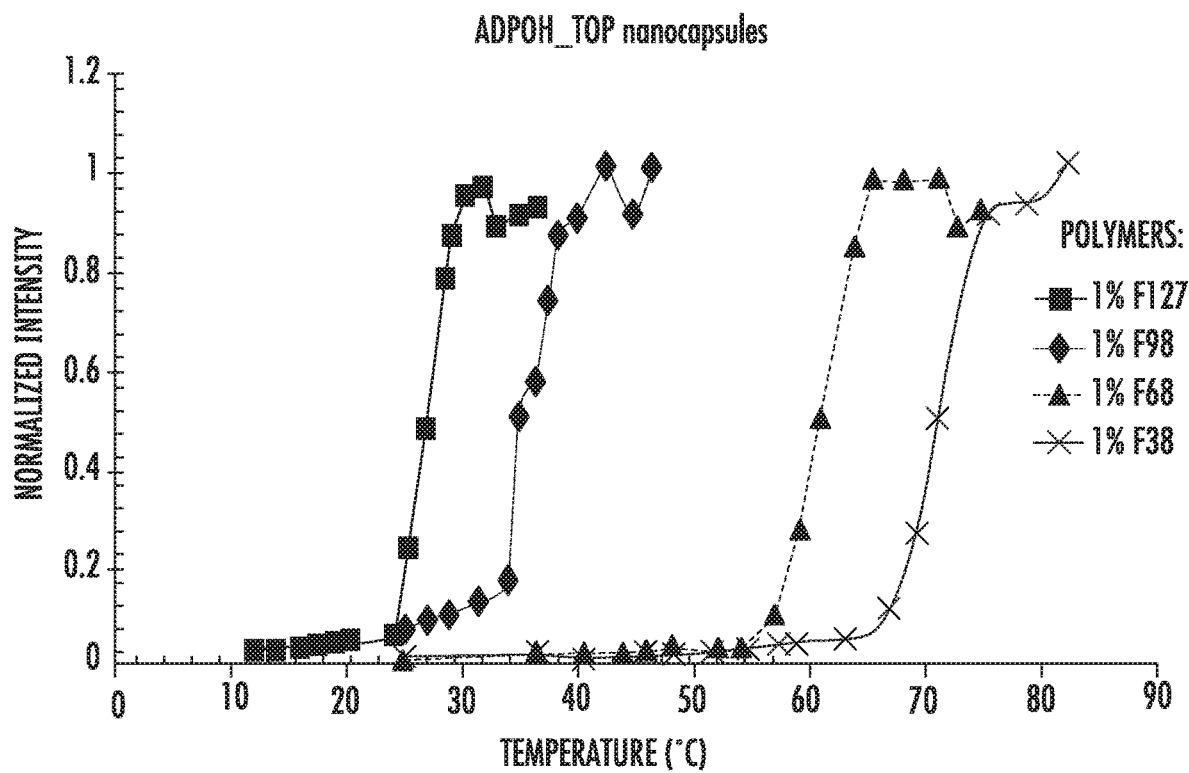
FIG. 8 illustrates plots of temperature-dependent on and off states for a series of ultrasound-switchable fluorophores according to some embodiments described herein.

FIG. 8 illustrates the fluorescence intensity as a function of temperature for ADP OH Top based fluorophores. More particularly, FIG. 8 shows excellent $I_{On}/I_{Off}$ ratios and varying $T_{th}$ (24° C., 33° C., 56° C., and 68° C.) for ADP OH Top encapsulated in different polymers: 1% Pluronic F127, 1% Pluronic F98, 1% Pluronic F68, and 1% Pluronic F38. This data demonstrates that the $T_{th}$ of an ultrasound switchable fluorophore of this type can be selected, at least in part, by choice of polymer.

Figure 9:
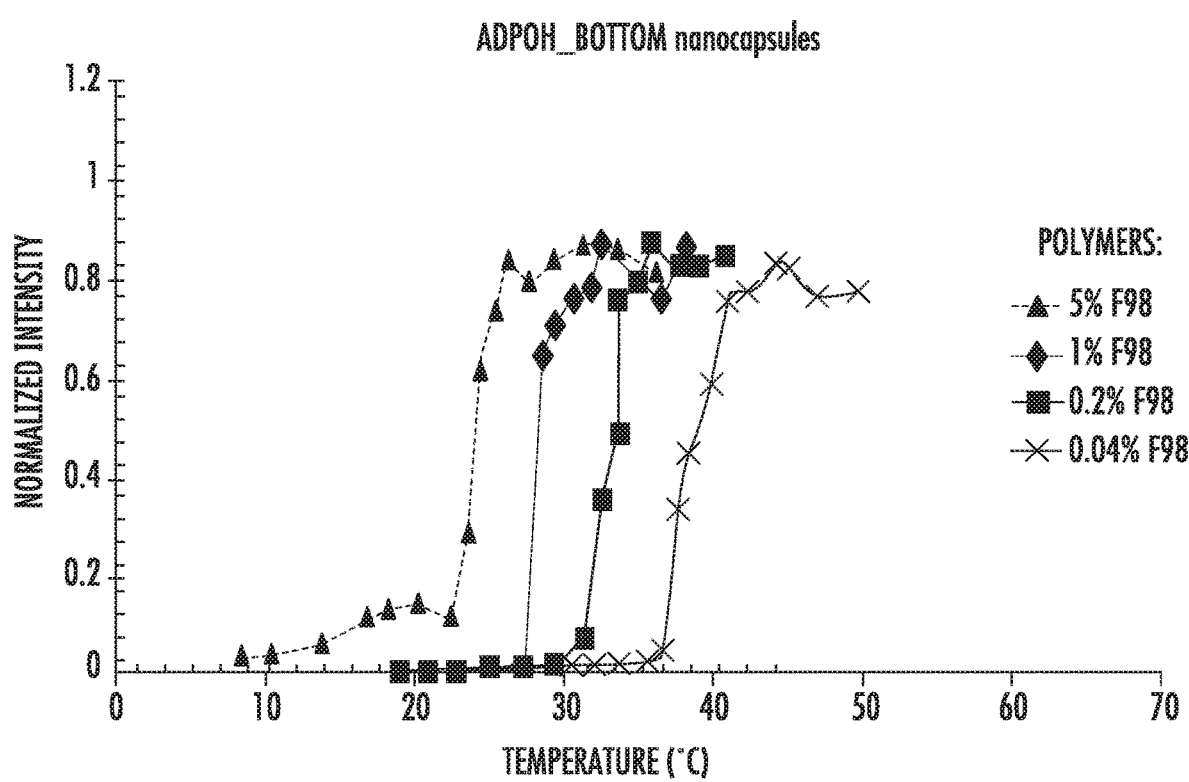
FIG. 9 illustrates plots of temperature-dependent on and off states for a series of ultrasound-switchable fluorophores according to some embodiments described herein.

FIG. 9 illustrates the fluorescence intensity as a function of temperature for ADP OH Bottom based fluorophores. FIG. 9 specifically shows excellent $I_{On}/I_{Off}$ ratios as well as varying $T_{th}$ values (28° C., 34° C., 39° C., and 47° C.) for ADP OH Bottom based nano-capsules, in which the dye is encapsulated in the same polymer (Pluronic F98) at different polymer concentrations (5%, 1%, 0.2% and 0.04%). This data shows that the $T_{th}$ can also be selected, at least in part, by choice of concentration. For reference purposes, the polymer concentrations above are w/v concentrations, based on grams of polymer divided by mL of solvent (water) used to form the mixture. For example, a "5%" polymer solution corresponds to 5 g polymer dissolved in 100 mL water, calculated as follows: 5 g/100 mL×100%=(5% g/mL).

As described above, the fluorophores described herein exhibited efficient fluorescence response to environmental temperature change, with high sensitivity, high accuracy, and wide dynamic range. Moreover, it has been demonstrated that it is possible to carry out thermometry methods, or other methods including temperature-based switching thresholds, by selecting or expanding the switching threshold range of a plurality of fluorophores used in the method. Specifically, the switching threshold range or "step size" between adjacent fluorophores in the range, can be selected by using different polymers for encapsulating a given dye and/or by using different concentrations of a given polymer nano-capsule.

Various embodiments of the present invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A method of measuring temperature in an environment, the method comprising:
   (a) disposing a population of ultrasound-switchable fluorophores in the environment, the population comprising a first ultrasound-switchable fluorophore having a first switching threshold temperature;
   (b) exposing the environment to an ultrasound beam to create an activation region within the environment, the activation region having a temperature greater than or equal to the first switching threshold temperature;
   (c) disposing the population of fluorophores within the activation region to switch at least one fluorophore of the population from an off state to an on state;
   (d) exposing the environment to a beam of electromagnetic radiation, thereby exciting at least one fluorophore of the population in the on state;
   (e) detecting a first photoluminescence signal emitted by the population of fluorophores; and
   (f) correlating the first photoluminescence signal with a first temperature or temperature range including the first switching threshold temperature.

2. The method of claim 1, wherein the first photoluminescence signal emitted by the population of fluorophores is detected using a detector comprising a plurality of optical fiber collectors coupled to a camera or photon counter, wherein the optical fiber collectors are spatially distributed around an exterior surface of the environment.

3. The method of claim 1, wherein correlating the first photoluminescence signal with a first temperature or temperature range comprises determining a final temperature (T(tp)) of the activation region following exposure of the activation region to the ultrasound beam according to Equation (1).

4. The method of claim 1, wherein the ultrasound beam is modulated and correlating the first photoluminescence signal with a first temperature or temperature range comprises determining a first peak-to-peak modulated photoluminescence signal based on the modulated ultrasound beam.

5. The method of claim 1, wherein exposing the environment to an ultrasound beam also heats the environment.

6. The method of claim 1, wherein correlating the first photoluminescence signal with a first temperature or temperature range comprises determining a temporal profile of the temperature of the activation region.

7. The method of claim 6, wherein determining the temporal profile of the temperature of the activation region comprises equating the first switching threshold temperature to the temperature of the environment at one or more time points, the time points corresponding to the initial detection or initial loss of the first photoluminescence signal.

8. The method of claim 1, wherein the population of ultrasound-switchable fluorophores further comprises a second ultrasound-switchable fluorophore having a second switching threshold temperature, the second switching threshold temperature being higher than the first switching threshold temperature.

9. The method of claim 8, wherein the activation region has a temperature greater than or equal to the second switching threshold temperature.

10. The method of claim 9, further comprising:
   (g) detecting a second photoluminescence signal emitted by the population of fluorophores; and
   (h) correlating the second photoluminescence signal with a second temperature or temperature range including the second switching threshold temperature.

11. The method of claim 10, wherein:
   exposing the environment to a beam of electromagnetic radiation comprises exposing the environment to a first excitation beam and a second excitation beam;
   wherein the first excitation beam and the second excitation beam have differing wavelength maxima; and wherein the first excitation beam primarily excites the first ultrasound-switchable fluorophore;

wherein the second excitation beam primarily excites the second ultrasound-switchable fluorophore; and wherein the first and second excitation beams are provided to the environment sequentially.

12. The method of claim 11, wherein:

the first photoluminescence signal is detected with a first detector or detection channel;

the second photoluminescence signal is detected with a second detector or detection channel;

the first detector or detection channel is off when the second photoluminescence signal is detected; and the second detector or detection channel is off when the first photoluminescence signal is detected.

13. The method of claim 10, wherein the population of ultrasound-switchable fluorophores further comprises a third ultrasound-switchable fluorophore having a third switching threshold temperature and a fourth ultrasound-switchable fluorophore having a fourth switching threshold temperature, the third switching threshold temperature being higher than the second switching threshold temperature and the fourth switching threshold temperature being higher than the third switching threshold temperature.

14. The method of claim 13, wherein the activation region has a temperature greater than or equal to the third switching threshold temperature or greater than or equal to the fourth switching threshold temperature.

15. The method of claim 14, further comprising:

(i) detecting a third photoluminescence signal emitted by the population of fluorophores;

(j) correlating the third photoluminescence signal with a third temperature or temperature range including the third switching threshold temperature;

(k) detecting a fourth photoluminescence signal emitted by the population of fluorophores; and (l) correlating the fourth photoluminescence signal with a fourth temperature or temperature range including the fourth switching threshold temperature.

16. The method of claim 15, wherein the first, second, third, and fourth temperatures or temperature ranges span a total temperature range in a continuous manner.

* * * * *